(12) United States Patent
Nussbaum et al.

(10) Patent No.: US 9,407,156 B2
(45) Date of Patent: Aug. 2, 2016

(54) MANAGING LEAKAGE INDUCTANCE IN A POWER SUPPLY

(71) Applicants: Michael Nussbaum, Newton, MA (US); Manoel Soares, Natick, MA (US)

(72) Inventors: Michael Nussbaum, Newton, MA (US); Manoel Soares, Natick, MA (US)

(73) Assignee: Bose Corporation, Framingham, MA (US)

( * ) Notice: Subject to any disclaimer, the term of this patent is extended or adjusted under 35 U.S.C. 154(b) by 275 days.

(21) Appl. No.: 13/891,503

(22) Filed: May 10, 2013

(65) Prior Publication Data

US 2014/0334195 A1  Nov. 13, 2014

(51) Int. Cl.
  *H02M 3/337* (2006.01)
  *H02M 1/00* (2006.01)
  *H02M 1/36* (2007.01)
  *H02M 1/42* (2007.01)
  *H02M 3/158* (2006.01)
  *H02M 3/335* (2006.01)

(52) U.S. Cl.
  CPC .......... *H02M 3/3376* (2013.01); *H02M 3/3378* (2013.01); *H02M 1/36* (2013.01); *H02M 1/4258* (2013.01); *H02M 3/158* (2013.01); *H02M 3/337* (2013.01); *H02M 3/3374* (2013.01); *H02M 3/33592* (2013.01); *H02M 2001/0006* (2013.01); *H02M 2001/007* (2013.01); *H02M 2001/0058* (2013.01); *Y02B 70/126* (2013.01); *Y02B 70/1475* (2013.01); *Y02B 70/1491* (2013.01)

(58) Field of Classification Search
  CPC .......... H02M 2001/0006; H02M 3/337; H02M 3/3372; H02M 3/3374; H02M 3/3376; H02M 3/3378
  See application file for complete search history.

(56) References Cited

U.S. PATENT DOCUMENTS

| 5,488,554 | A | * | 1/1996 | Green | H02M 3/3372 363/134 |
| 5,923,547 | A | * | 7/1999 | Mao | H02M 1/34 363/132 |
| 5,978,238 | A | * | 11/1999 | Liu | H02M 3/33576 363/17 |
| 6,288,913 | B1 | * | 9/2001 | White | 363/16 |
| 7,859,870 | B1 | * | 12/2010 | Schutten | H02M 3/337 363/132 |
| 7,986,187 | B1 | | 7/2011 | Nussbaum et al. | |
| 8,384,478 | B2 | | 2/2013 | Nussbaum et al. | |
| 2003/0103360 | A1 | * | 6/2003 | Hatta et al. | 363/17 |

(Continued)

FOREIGN PATENT DOCUMENTS

EP  0647086 A1  4/1995
WO  2013046259 A1  4/2013

OTHER PUBLICATIONS

Abramovitz et al., "A Resonant Power Factor Conditioner," IEEE Power Electronics Specialists Conference (PESC 93), 995-1001, 1993.

(Continued)

*Primary Examiner* — Fred E Finch, III

(57) ABSTRACT

An apparatus includes: a power supply circuit including at least a first stage having a push-pull circuit topology, the first stage including at least one transformer that isolates a primary side of the first stage from a secondary side of the first stage; a clamp circuit coupled to a center tap of the transformer, the clamp circuit including a first element that stores energy, and a second element that controls a flow of current between the center tap of the transformer and the first element; and a control module receiving power from the clamp circuit. The control module is configured to provide control signals to one or more elements of the power supply circuit.

28 Claims, 38 Drawing Sheets

(56) References Cited

U.S. PATENT DOCUMENTS

2007/0025125 A1* 2/2007 Nakahori et al. .......... 363/56.02
2010/0327765 A1 12/2010 Melanson et al.
2013/0069551 A1* 3/2013 Kitamura et al. ............. 315/205

OTHER PUBLICATIONS

Bersani, "Switch Mode Power Supply (SMPS) Topologies (Part II)" (2009).
Bruemmer et al., "Efficient Design in a DC to DC Converter Unit," NASA/TM-2002-211804, IECEC-2002-20032, Aug. 2002.
Cuk et al., "Single-Stage Bridgeless Isolated PFC Converter Achieves 98% Efficiency," Power Electronics Technology, Oct. 2010.
Dixon, Jr., "Switching Power Supply Topology Review," (2001).
Gulko et al., "Current-Sourcing Push-Pull Parallel-Resonance Inverter (CS-PPRI): Theory and Application as a Fluorescent Lamp Driver," (1994).
Ivensky et al., "Current-Fed Multi-Resonant DC-DC Converter," IEEE Applied Power Electronics Conference (APEC '93) Record, pp. 58-64, Mar. 1993.
Jordan et al., "Resonant Fluorescent Lamp Converter Provides Efficient and Compact Solution," (1999).
Linear Technology, "Isolated No Opto-Coupler Flyback Controller with Active PFC," Linear Technology Corporation (2012).
Locher, "Optimizing the Ultra-Fast POWERplanar™ Rectifier Diode for Switching Power Supplies," National Superconductor, Jan. 1999.
Moschopoulos, et al., "Single-Phase Single-Stage Power-Factor-Corrected Converter Topologies," IEEE Transactions on Industrial Electronics, vol. 52, No. 1, Feb. 2005.
National Semiconductor, "Cascaded PWM Controller," Apr. 2004.
ON Semiconductor, "SWITCHMODE™ Power Supply," Jul. 2002.
Texas Instruments, "Buck Current/Voltage Fed Push-Pull PWM Controllers," Apr. 1999—revised Apr. 2011.
Torrico Bascopé et al., "Isolated Flyback-Current-Fed Push-Pull Converter for Power Factor Correction," IEEE (1996).
Ulmann, "Preliminary Telecom Input Protection," Jun. 22, 2010.
Zhu, et al., "New Start-Up Schemes for Isolated Full-Bridge Boost Converters," IEEE Transactions on Power Electronics, vol. 18, No. 4, Jul. 2003.
International Search Report and Written Opinion dated Sep. 26, 2014 for International application No. PCT/US2014/035822.

* cited by examiner

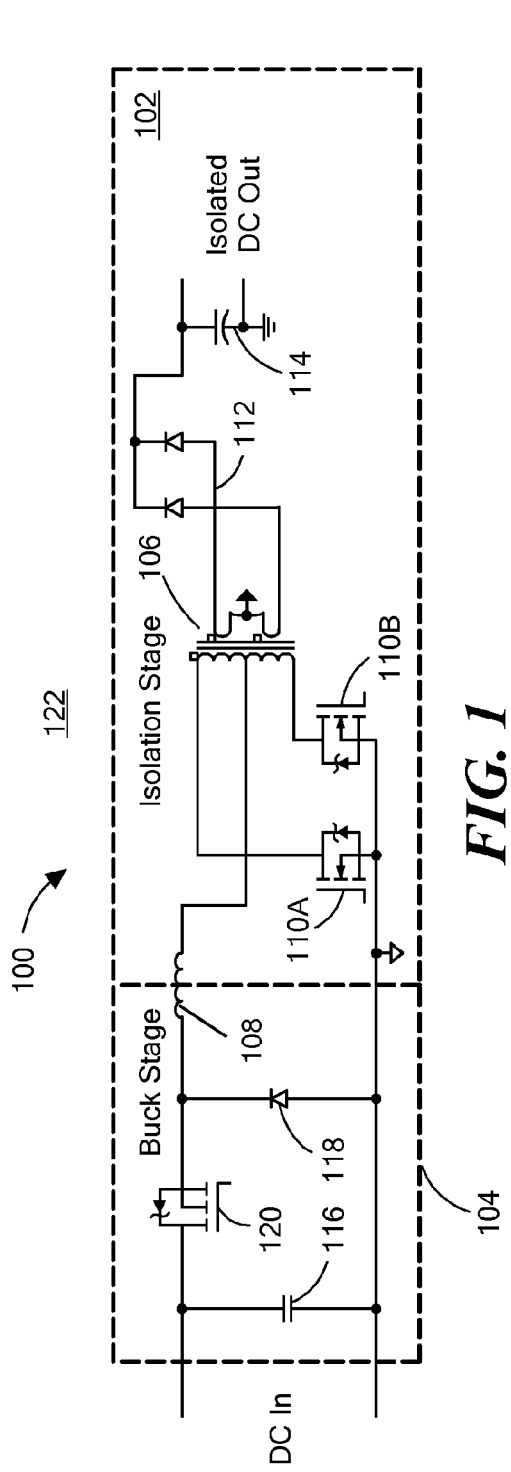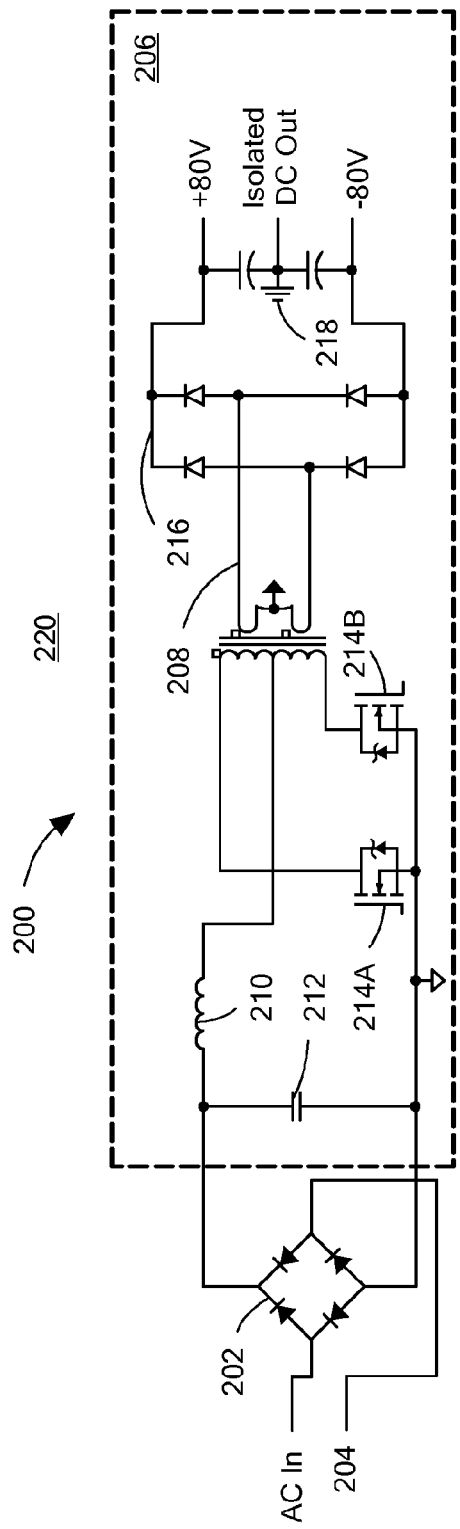

MANAGING LEAKAGE INDUCTANCE IN A POWER SUPPLY

BACKGROUND

This description relates to managing leakage inductance in a power supply.

A variety of types of power supplies (also called power converters) provide an approximately constant (i.e., DC or "direct current") output voltage from a sinusoidal (i.e., AC or "alternating current") input voltage (e.g., from an AC mains source), thus providing AC-DC conversion (also called "rectification"). Other types of power supplies provide AC-AC conversion, DC-DC conversion, or DC-AC conversion (also called "inversion"). Some power supplies include multiple stages, which may include a combination of different types of converters, such as a DC-DC converter stage within a DC-AC power supply. Converter stages that provide a DC voltage may use a regulator to maintain the DC voltage near a constant value. A linear power supply uses a linear regulator, and a switched-mode (or "switching") power supply uses a switching regulator that switches between on and off states to regulate power transfer and maintain the DC voltage.

Switched-mode power supplies can be classified as having different types of circuit topology. For example, some topologies include one or more stages that have certain arrangements of components that perform specific functions (e.g., buck, boost, or buck-boost stages). Some "isolated" circuit topologies provide "isolation" using a transformer to prevent certain current flows between isolated stages of the power supply. Examples of different circuit topologies that can be configured to provide isolation include: full bridge, half bridge, and push-pull. These circuit topologies correspond to different arrangements of switches, and can be used in either isolated or non-isolated power supplies. Another example of a circuit topology that can be configured to provide isolation is flyback, which refers to a specific way of using a transformer. Certain classes of power supply are also identified by certain specific features of their circuit topology. For example, a power supply (switched-mode or linear) that operates directly from an AC mains source is called an "off-line" power supply.

Some power supply circuits use power factor correction (PFC) to increase the circuit's "power factor" which can be defined as the ratio of the total "active power" (the true power being drawn from the source) to the total "apparent power" drawn from the source (based on a vector sum of the true power and the reactive power at the output). Increasing the power factor reduces losses incurred in the upstream power distribution system. Often, power supplies with PFC functionality include two stages: a front end boost converter controlled as a PFC stage, and an isolated DC/DC converter as a second stage. Some two-stage converters have a number of positive attributes, including reduced total switch root mean square (RMS) current for a given output power, but tend to entail significant complexity, with many semiconductor switches and passive components (e.g., inductors and capacitors). For some applications, the ability to supply large peak power is useful. Power supplies for audio applications, for example, typically need to supply peak powers of at least 3 times the average power—other attributes besides RMS currents at maximum output can dominate the economics and desirability of a power supply under these circumstances.

Transformers used to isolate stages in these power supplies exhibit what is called "leakage inductance", representing an imperfect coupling of magnetic field between the primary and secondary windings of the transformer. Some amount of leakage inductance is inevitable—it is impossible to have two coils experience perfect magnetic coupling. The effect of leakage inductance on the push-pull topology, for example, is generally to add voltage spiking on the drains of the switches, requiring extra voltage margin—this is one of the reasons that this topology is rarely used for off-line power supplies. Circuitry such as a dissipative or non-dissipative snubber can be used to alleviate this problem, but there are limitations to that approach.

SUMMARY

In one aspect, in general, an apparatus includes: a power supply circuit including at least a first stage having a push-pull circuit topology, the first stage including at least one transformer that isolates a primary side of the first stage from a secondary side of the first stage; a clamp circuit coupled to a center tap of the transformer, the clamp circuit including a first element that stores energy, and a second element that controls a flow of current between the center tap of the transformer and the first element; and a control module receiving power from the clamp circuit, the control module configured to provide control signals to one or more elements of the power supply circuit.

Aspects can include one or more of the following features.

The first element comprises a capacitor.

The flow of current between the center tap of the transformer and the first element is bidirectional.

The second element comprises a diode.

The diode has a reverse recovery time between about 200 ns and 800 ns.

The second element comprises a switch.

The switch comprises at least one transistor controlled by a signal from the control module.

The power supply comprises a switched-mode power supply that includes at least two switches in the first stage controlled by signals from control circuitry.

At least some of the control circuitry providing the signals to the switches is included in the control module.

The switches comprise transistors that include Silicon carbide.

The control circuitry is configured to: detect instantaneous values and peak values of voltage across open switches in the first stage, detect instantaneous values of current flowing from the primary side to the center tap, and calculate thresholds to be compared to the detected values to determine times at which to send control signals to open or close the switches in the first stage.

Comparing the detected values to the calculated thresholds to determine the times at which to send the control signals includes: in response to detected current values rising to a calculated threshold, sending a control signal to open one of the switches, and in response to voltage across one of the switches falling to a calculated threshold, closing one of the switches.

The control circuitry is configured to enable control signals to alternate the switches between open and closed states according to a pattern that includes at least a portion in which a first switch is open while a second switch is closed and the first switch is closed while the second switch is open.

During startup of the power supply, a feeding current from the primary side flows into the center tap of the transformer when the control signals are enabled.

During startup of the power supply, the control circuitry is configured to periodically disable the control signals to maintain both the first and second switches in the open state, and thereby redirect the feeding current from the center tap of the transformer to the clamp circuit, in response to the feeding current reaching a predetermined maximum threshold.

The control circuitry is configured to control the switches such that an AC current flowing into an input of the power supply is substantially proportional to an AC voltage across the input of the power supply.

The apparatus further includes an auxiliary power supply circuit coupled to the clamp circuit that receives power from the clamp circuit and provides power to at least the control module.

The primary side includes a third element that provides current to a center tap of the transformer.

The primary side is coupled to a rectifier circuit that provides a current to the third element from an input configured to couple to an AC line voltage.

The third element comprises an inductor.

The primary side includes a fourth element that participates in magnetizing inductance resonance.

The fourth element is coupled to the transformer.

The fourth element comprises at least one capacitor.

The secondary side includes a plurality of diodes coupled to the transformer.

The secondary side includes at least one capacitor configured to filter an output voltage for the power supply.

The secondary side is configured to provide at least 200 W of power when the primary side is coupled to an AC line voltage.

The secondary side is configured to provide at least 500 W of power when the primary side is coupled to an AC line voltage.

The secondary side is configured to provide at least 2 kW of power when the primary side is coupled to an AC line voltage.

Various advantages of the overall design and operation of the different embodiments of the power supply are described in detail throughout this description, and include a reduced parts count, enhanced efficiency, smaller size, and reduced cost.

Other features and advantages of the invention are apparent from the following description, and from the claims.

DESCRIPTION OF DRAWINGS

FIG. 1 is a circuit diagram of power supply converter stages.

FIG. 2 is a circuit diagram of a single-stage power supply.

DESCRIPTION

Figure 3:
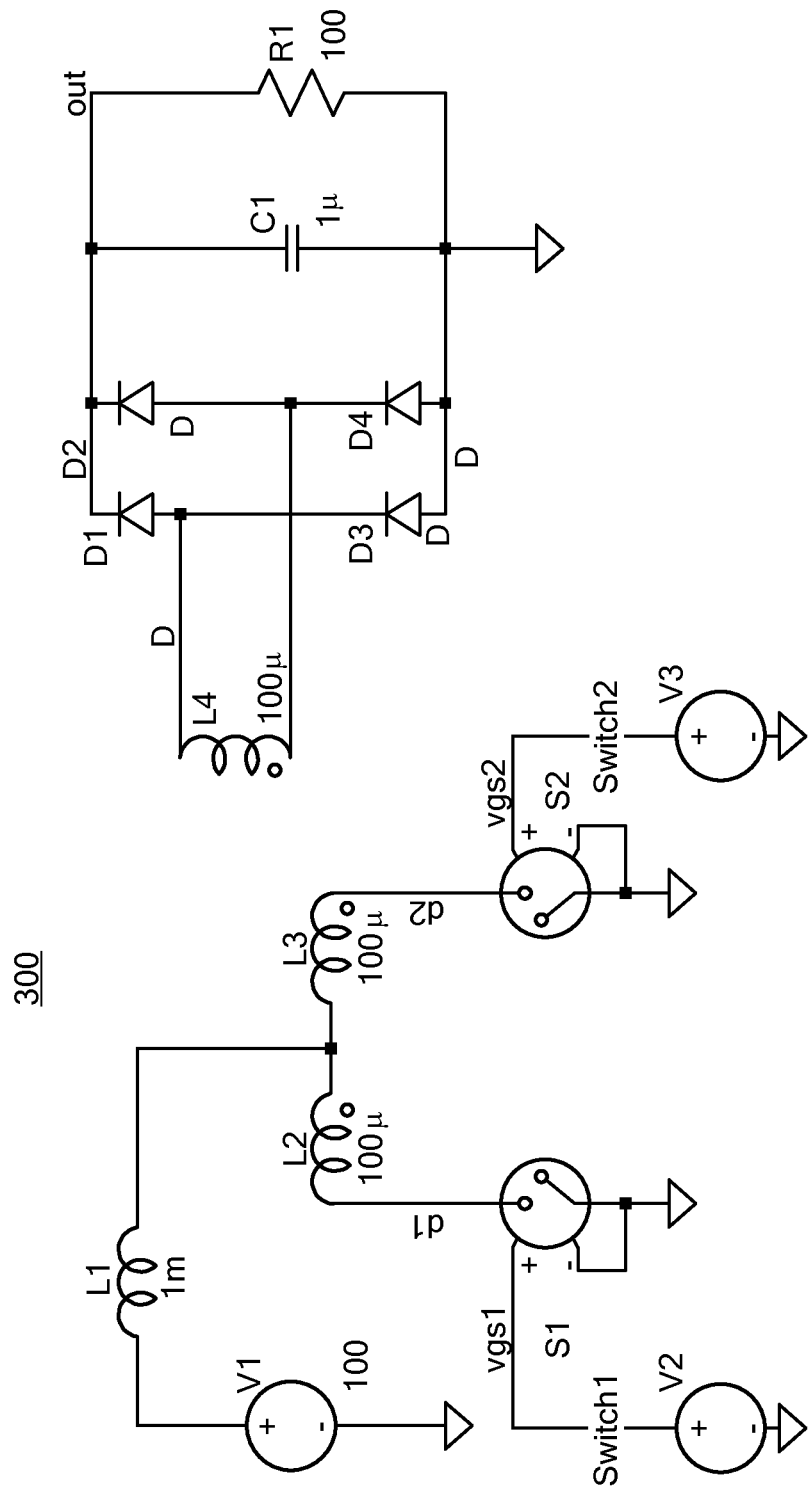
FIGS. 3, 7, 11, and 15 are diagrams of circuit models of a power supply.

Some power supplies combine a PFC stage and an isolation stage into a single stage of the power supply, allowing a significantly reduced parts count, and a smaller, less expensive converter. An example of a combined isolating PFC stage is a flyback converter operated with appropriate control. However, flyback converters are generally only suitable for relatively low power operation, on the order of 100 W or below. Some of the techniques described herein enable a power supply with an isolating PFC stage suitable for relatively large output power (e.g., 200 W-2 kW) for applications such as large audio amplifiers. With such a large output power, some leakage inductance mitigation schemes would waste a significant amount of power. Techniques can be used to redirect some power lost due to leakage inductance A converter stage with a push-pull circuit topology can be included in a power supply and configured to enable a leakage inductance mitigation scheme that redirects a significant amount of power for a control module of the power supply. A specific example of such a topology, known as a "current fed push-pull" topology, is shown in FIG. 1. A power supply 100 includes a push-pull converter stage 102, and an upstream buck converter stage 104. The push-pull converter stage 102 includes a transformer 106 with a center tap on its primary winding coupled to an inductor 108 common to the two stages. The primary winding is also coupled to a first switch 110A on one end and a second switch 110B on the other end. The secondary winding is coupled to output diodes 112 and a capacitor 114 that provides an isolated DC output. The buck stage 104 includes an input capacitor 116, a switch 120 (here implemented with a MOSFET), and a second switch 118 (here implemented with a diode). A control module 122 controls the switches of the power supply 100, including the opening and closing of the switches 110A and 110B, as described in more detail below. With the presence of the inductor 108 coupled to the center tap of the transformer 106, this power supply 100 is an example of a power supply having a current-fed push-pull topology, where current-fed topologies are characterized by a converter stage being driven from a high impedance source. Alternative circuit configurations do not include the upstream buck converter.

Some circuits are configured to operate in a resonant mode by including a stage with a resonant mode converter topology (e.g., a stage including a resonant L-C circuit). Other variations of power supply circuits having a push-pull topology are possible, including converters having the "Weinberg topology," converters having a multi-resonant current fed power factor conditioner topology, and converters having a flyback fed push-pull topology. Some aspects of the techniques described herein are enabled by the use of digital control and silicon carbide (SiC) power devices, which can tolerate relatively high voltages, within the power supply circuit.

FIG. 2 shows an example of a power supply 200 without the upstream buck converter of the power supply 100. An input rectifier 202 (an arrangement of diodes) couples an AC input 204 (e.g., an AC line voltage) to an isolated PFC converter 206 also having a push-pull circuit topology. The converter 206 includes a transformer 208 with a center tap on its primary winding coupled to an input inductor 210. The primary side of the isolated PFC converter 206 also includes an input capacitor 212. The primary winding is also coupled to a first switch 214A on one end and a second switch 214B on the other end. The switches 214A and 214B are part of the switching regulator that controls the DC output voltage, as well as the AC input current. The secondary winding is coupled to output rectifiers 216 (an arrangement of diodes), and a capacitor set 218 that provides an isolated DC output voltage. A control module 220 controls the switches of the power supply 200, including the opening and closing of the switches 214A and 214B, as described in more detail below. With the presence of the input inductor 210 coupled to the center tap of the transformer 208, this power supply 200 is also an example of a power supply having a current-fed push-pull topology.

The basic operation of the power supply 200 is described with reference to a circuit model 300 of a Simulation Program with Integrated Circuit Emphasis (SPICE) circuit simulator program, shown in FIG. 3. A voltage source V1 represents the AC line voltage, an input inductor L1 represents the input inductor 210. A switch S1, representing switch 214A, is controlled by a control signal represented by a voltage source V2, and a switch S2, representing switch 214B, is controlled by a control signal represented by a voltage source V3. Inductors L2 and L3 represent the two portions of the primary winding of the transformer 208, from the center tap to one side of the winding, and from the center tap to the other side of the winding, respectively. An inductor L4 represents the secondary winding of the transformer 208.

Figure 4:
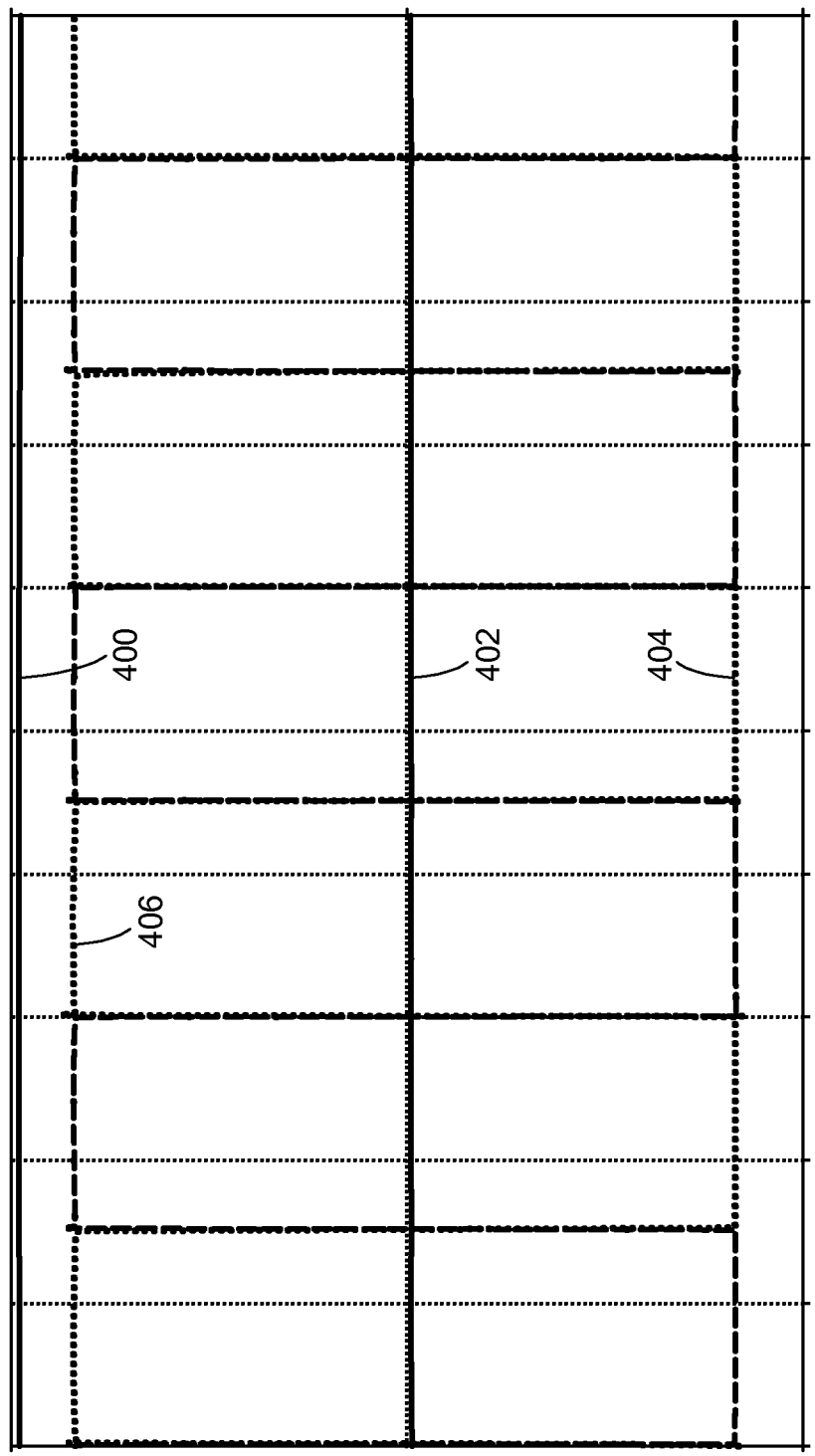
FIGS. 4-6, 8-10, 12, and 16 are sets of plots of circuit signal waveforms.
Figure 5:
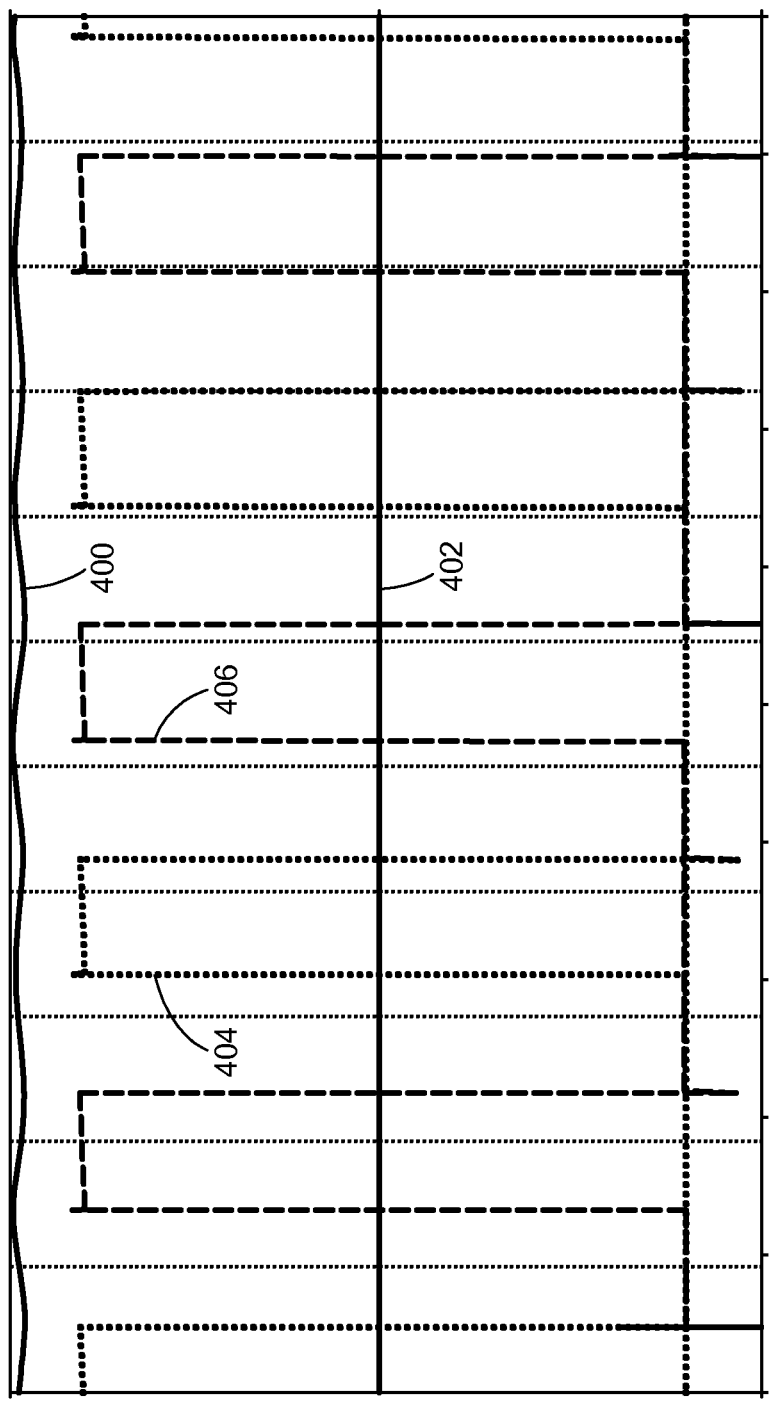

FIG. 4 shows waveforms resulting from a simulation based on the model 300, including a waveform 400 of the current in the input inductor L1, a waveform 402 of the output voltage $V_{out}$, a waveform 404 of the voltage on the switch S1, and a waveform 406 of the voltage on the switch S2, when the switches S1 and S2 are run at 50% duty cycle D (i.e., each switch is on for half the period). There is relatively small ripple in the current in the input inductor L1, and the peak voltage on the switches S1 and S2 is 2 N $V_{out}$, and the output voltage is $V_{out}$=N$V_{in}$ (where N is the transformer turns ratio, assumed to be unity in the following example for simplicity). For the same circuit, FIG. 5 shows the same waveforms when the switches S1 and S2 are run at 75% duty cycle there is some ripple in the current in the input inductor L1, and the circuit exhibits voltage gain. In fact, the voltage gain of the power supply 200 is similar to that of a simple boost converter:

$$\frac{V_{out}}{V_{in}} = N \frac{1}{1-D_b}$$

where $$D_b = 2(D-0.5)$$

With a current fed boost converter D≥0.5, which corresponds to $D_b$≥0. It can be seen that attempting to operate such a converter with D<0.5, which corresponds to both switches S1 and S2 being open simultaneously, would result in no path for the current in the input inductor L1 and the power supply 200 would not operate correctly.

A corollary to this is that the minimum voltage gain of the circuit is N (the transformer turns ratio), when the power supply 200 is operated at a minimum allowed duty cycle D of 0.5. If the output voltage $V_{out}$ is below this critical value (N $V_{in}$), then the current in the inductor L1 is not controllable. For this reason, the push-pull converter stage 102 shown in FIG. 1 is coupled to the upstream buck converter stage 104, which allows operation for any output voltage condition. Generally, this buck converter stage 104 is used as the circuit's switching regulator and the push-pull converter stage 102 is operated at a fixed 50% duty cycle (D=0.5), with some slight overlap to account for finite switching times.

In some implementations a switching regulator of a power supply is configured to use a servo to control the duty cycle of a push-pull converter stage to get output voltage regulation for normal operating conditions, and to use an upstream buck converter stage as a regulator for startup, light load, and fault conditions.

An observation relevant for some power supplies is that the push-pull topology inherently results in twice the voltage imposed on the main switches when compared to a full bridge (with four switches). More than twice the voltage results when leakage energy is considered (as described in more detail below). For this reason, most power supplies do not employ the push-pull topology for high input voltage off-line applications. However, high voltage devices based on SiC semiconductors (e.g., devices operating up to voltages around 1200V) can be incorporated into topologies such as push-pull to exploit the strengths of these devices to build power supplies with desirable characteristics.

Figure 6:
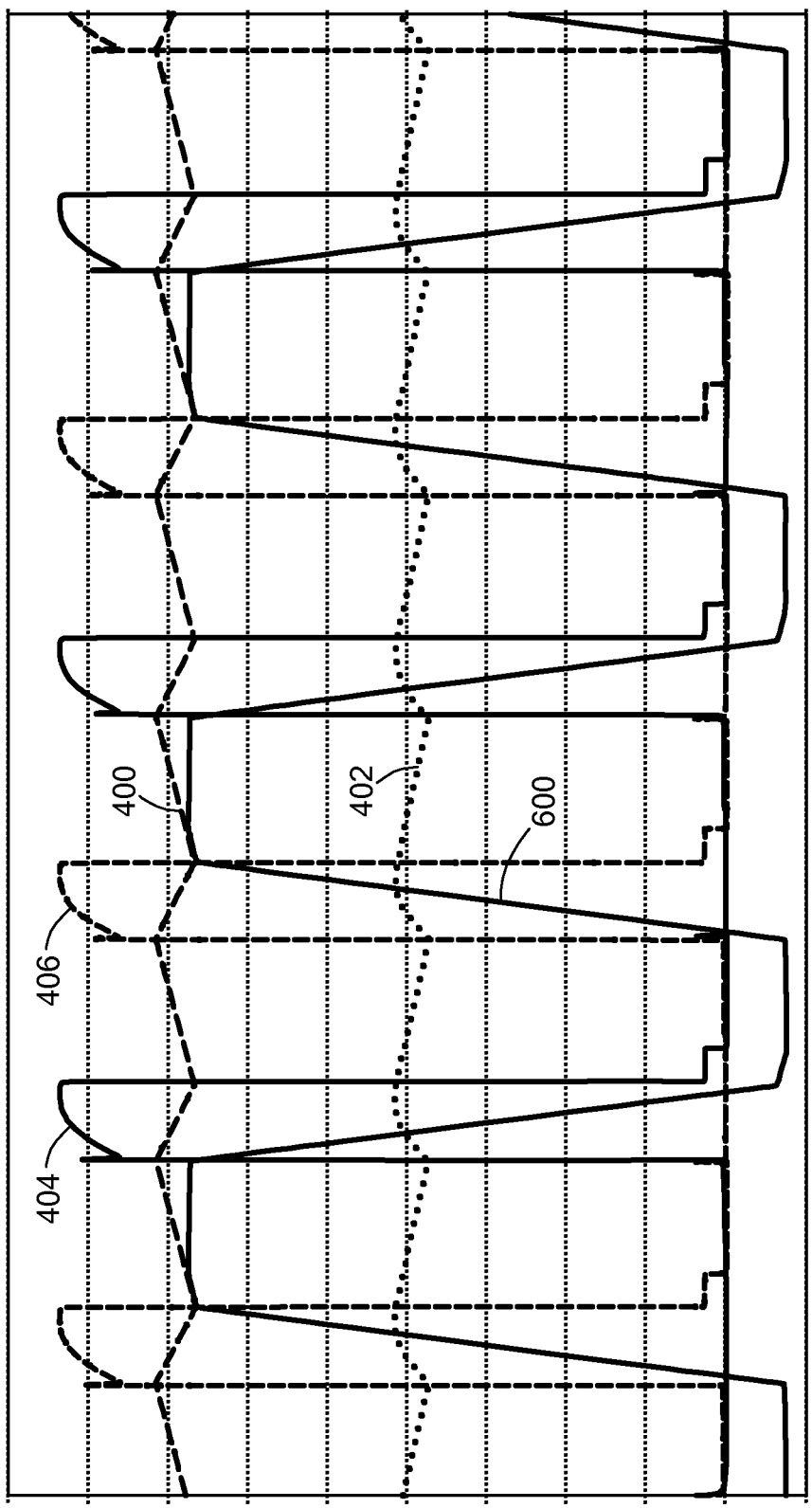

A characteristic of the power supply 200 is illustrated by waveforms, shown in FIG. 6, resulting from another simulation based on the same model 300. Here the commanded duty cycle was also 75%, as in the simulation illustrated in FIG. 5, but the switching frequency was reduced by a factor of ten. The resulting switch duty cycle is significantly more than the commanded duty cycle. What is happening is that the transformer magnetizing current, the trapezoidal waveform 600, is catching up to the current in the input inductor L1 represented by waveform 400. When that happens the current in the output rectifier goes to zero and the voltage across the transformer, and therefore the voltage 404 across the switch S1 and the voltage 406 across the switch S2, collapses.

Figure 7:
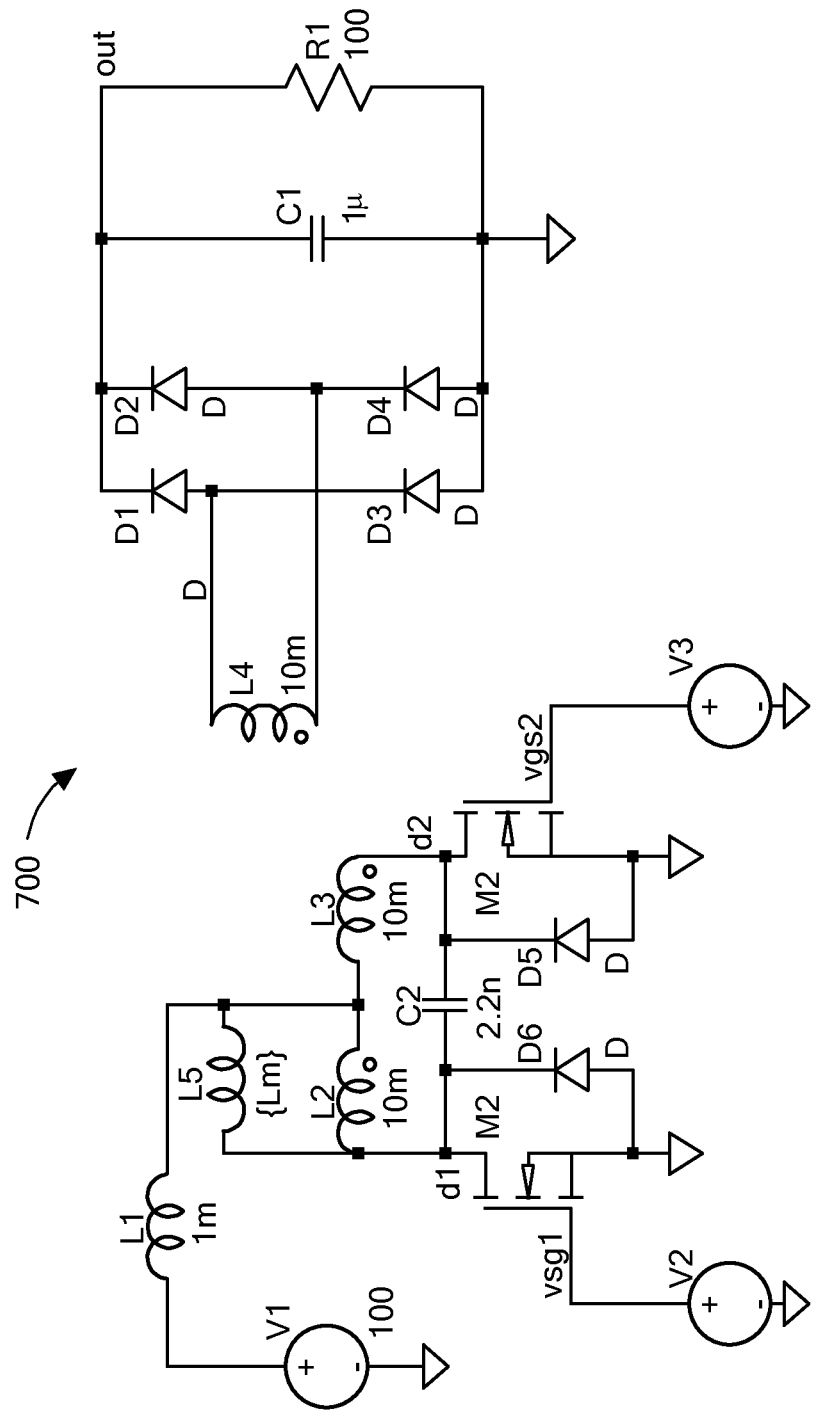
Figure 8:
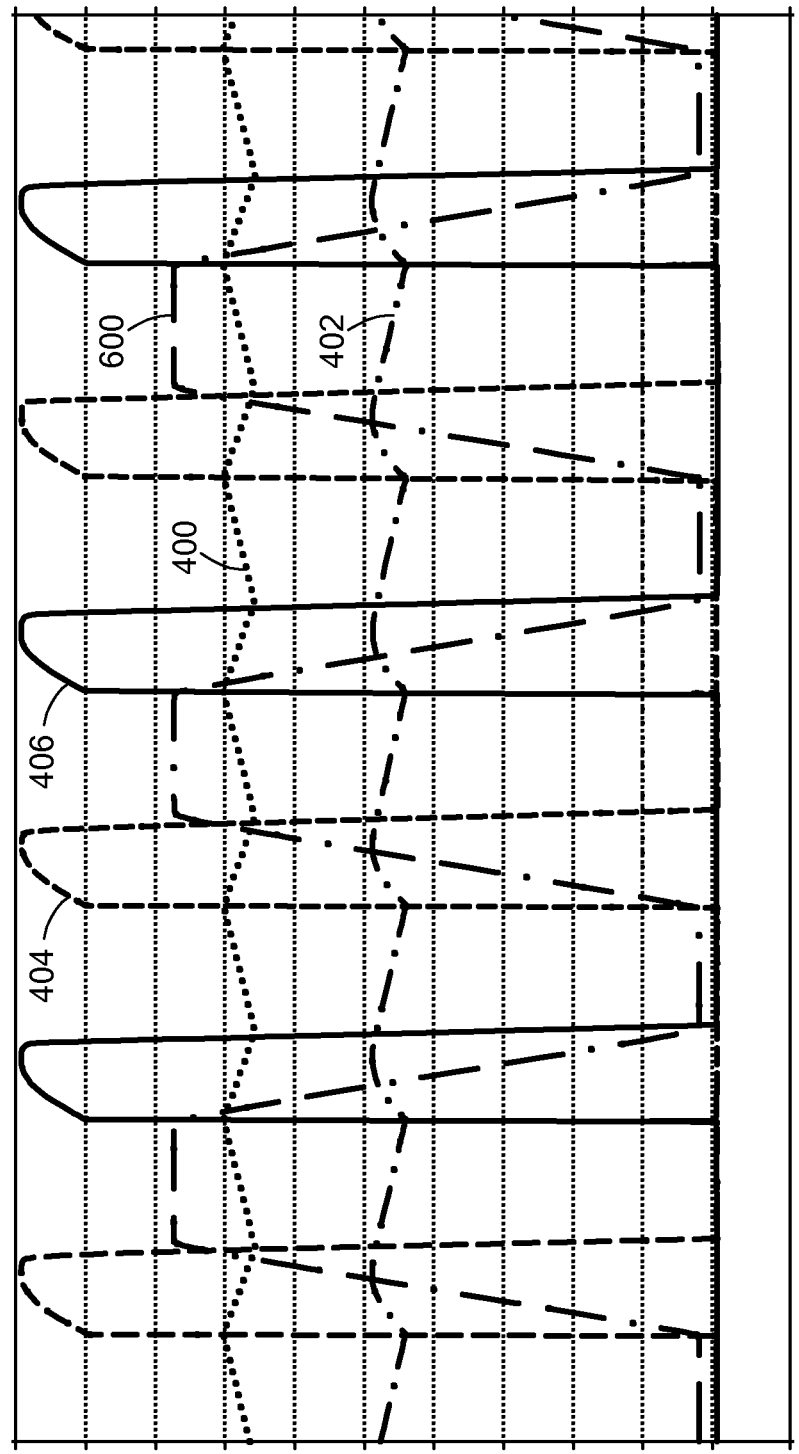

However, this characteristic is exploited in some implementations of the power supplies disclosed herein. Under these conditions the power supply experiences zero voltage switching (ZVS)—the voltage falls by itself, driven by the currents in the magnetic system, and giving switching without the associated losses. FIG. 7 shows the SPICE model 700 slightly modified with a capacitance, C2, placed between the drains of the switches M1 and M2, which are now represented by metal-oxide-semiconductor field-effect transistors (MOSFETs) instead of the ideal switches S1 and S2 of the model 300 shown in FIG. 3. This capacitance, C2, represents both explicit capacitance added to the circuit, the parasitic drain-source capacitance of the switches M1 and M2, and additional parasitic capacitance that exists in the transformer represented by L2, L3, L4 and Lm, and is the capacitance that participates in the magnetizing inductance resonance. FIG. 8 shows waveforms very similar to those shown in FIG. 6, resulting from a simulation based on the model 700, with the transformer simulated as an "ideal transformer" with a coupling from its primary winding to its secondary winding assumed to have a value of 1.0 (i.e., a perfect coupling with no leakage inductance). Maintaining this ZVS condition imposes specific requirements on the control module 220 of the power supply 200—this voltage fall is sensed by the control module 220, and the switches M1 (214A) and M2 (214B) are turned on in response to it. In alternative embodiments, the switches S1 and S2 can be implemented using any of a variety of types of circuitry, including for example: Si IGBT (which is a relatively low cost alternative); SiC MOSFET (which enable a more efficient system, at a higher cost); SiC JFET (similar to the SiC MOSFET); SiC BJT (similar to the SiC MOSFET). Such switch circuitry is able to handle both high voltage and high current levels, which some other switch circuitry (e.g., Si MOSFET) may be able to handle high voltage levels (e.g., around 1200V), but not necessarily the high current levels needed for some applications.

Figure 9:
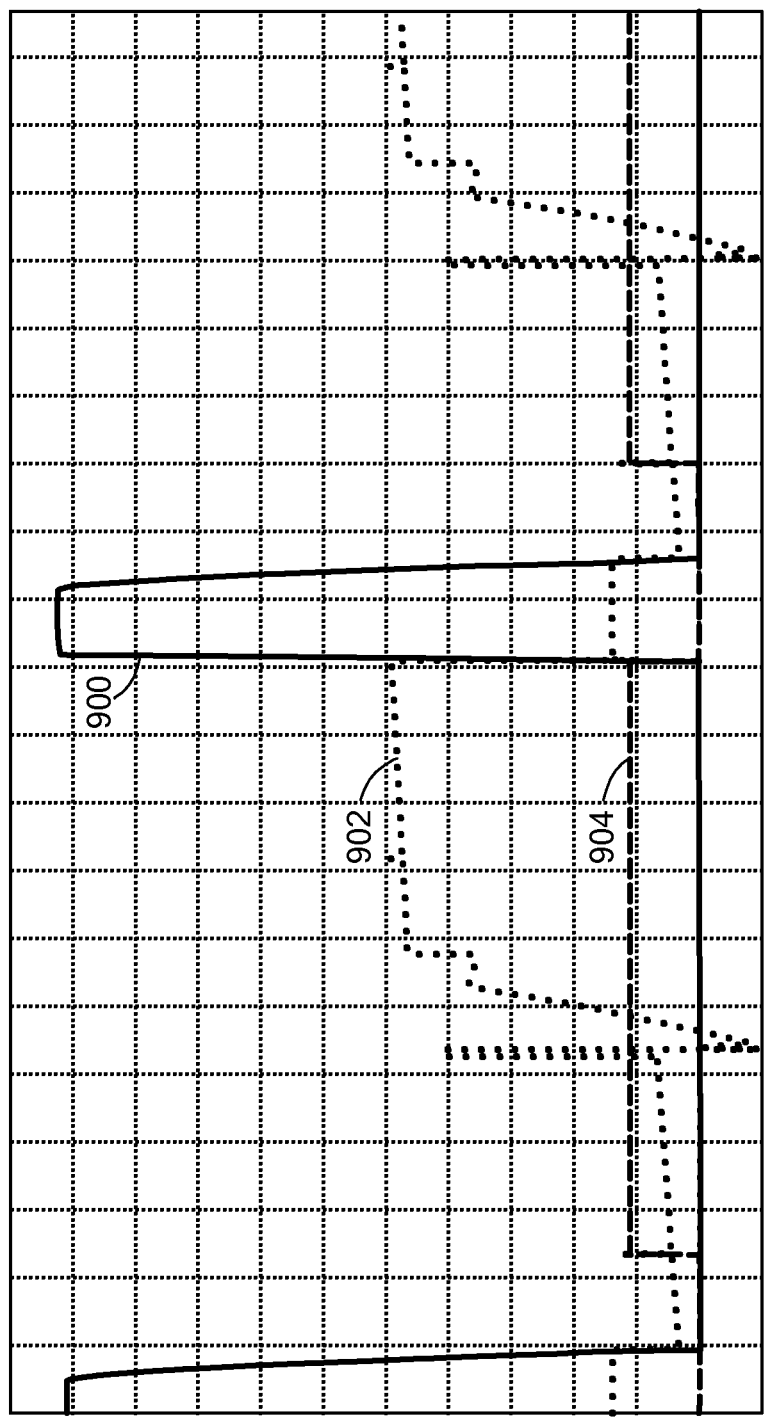

FIG. 9 shows waveforms illustrating more detail of this switching process. The waveform 900 is the voltage on the drain of switch M1, the waveform 902 is the current through switch M1 and the waveform 904 is the gate voltage controlling M1. It can be seen that the drain voltage 900 falls first (at a time of 0.941 ms), and is accompanied by a negative current 902 through the switch M1. This fall illustrates the magnetizing inductance resonance—it can be seen that the fall is not instantaneous, but instead describes a truncated sinusoidal profile governed by the ring between the capacitance C2 and the parallel combination of magnetizing inductance Lm and the input inductor L1. Some time after that (at about 0.945 ms) the control module 220 turns on the switch—after the drain voltage is already 0. This is an example of "zero voltage switching" (ZVS). It can be seen that the current is sloping upwards—in response to the drain voltage ringing to 0V, the control module 220 turns the switch M1 on before the current goes positive, or the drain voltage will not be clamped to zero. This is also an example of making use of the magnetizing inductance resonance in this circuit topology.

Figure 10:
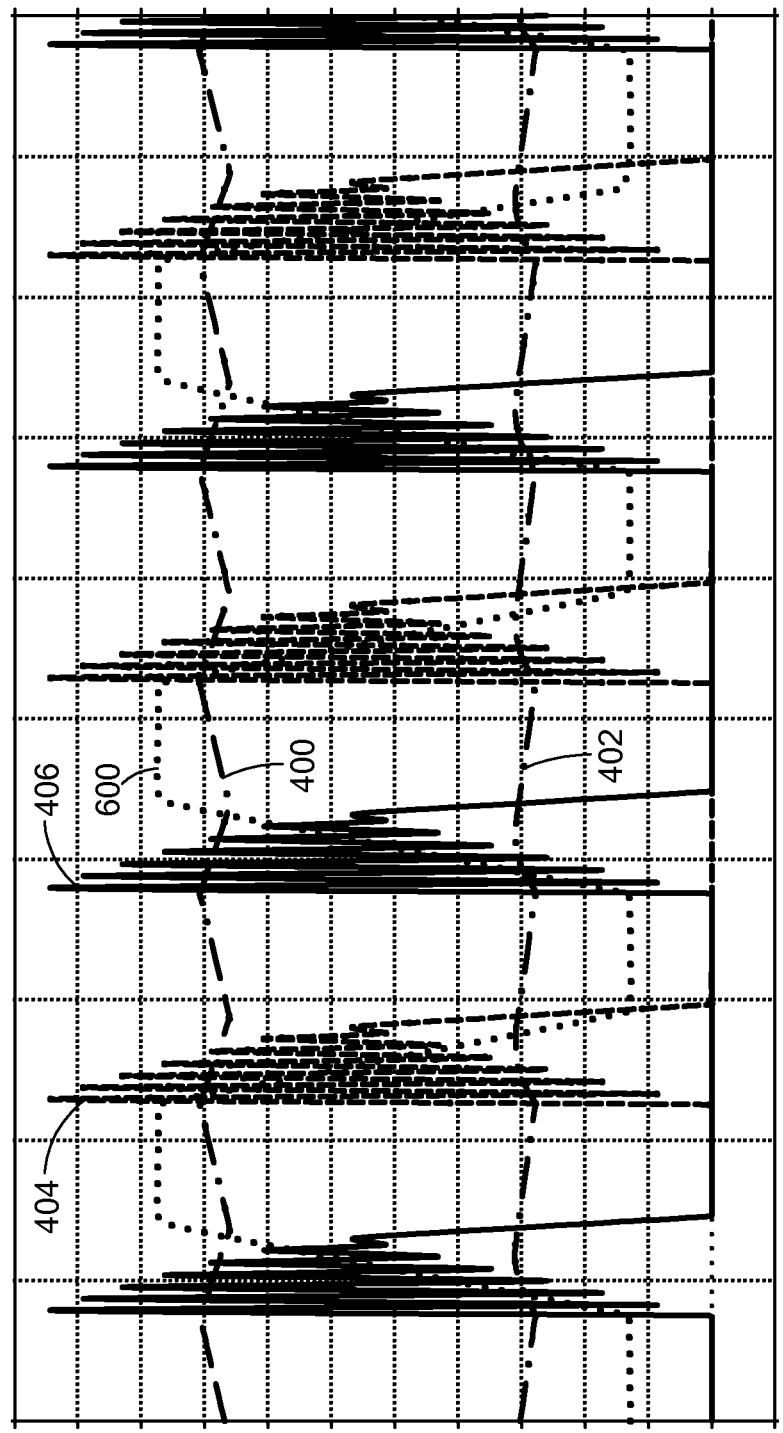

FIG. 10 shows waveforms resulting from a simulation based on the SPICE model 700 run under the same conditions as were used in the simulation resulting in the waveforms of FIG. 8, but with one change—the transformer coupling from its primary winding to its secondary winding was changed from 1.0 to 0.99, which corresponds to a leakage inductance of about 2 μHy, which is realistic for transformers of this size and type (e.g., with a power handling capability of around 500 W to 2 kW, and a volume of around 50-500 cubic centimeters, as described in more detail in U.S. Pat. No. 8,384,478, incorporated by reference herein). Notice that the peak drain voltages have increased from almost 500V to almost 800V, which represents one of the potential issues that can be addressed in some of the embodiments of power supplies described herein.

Figure 11:
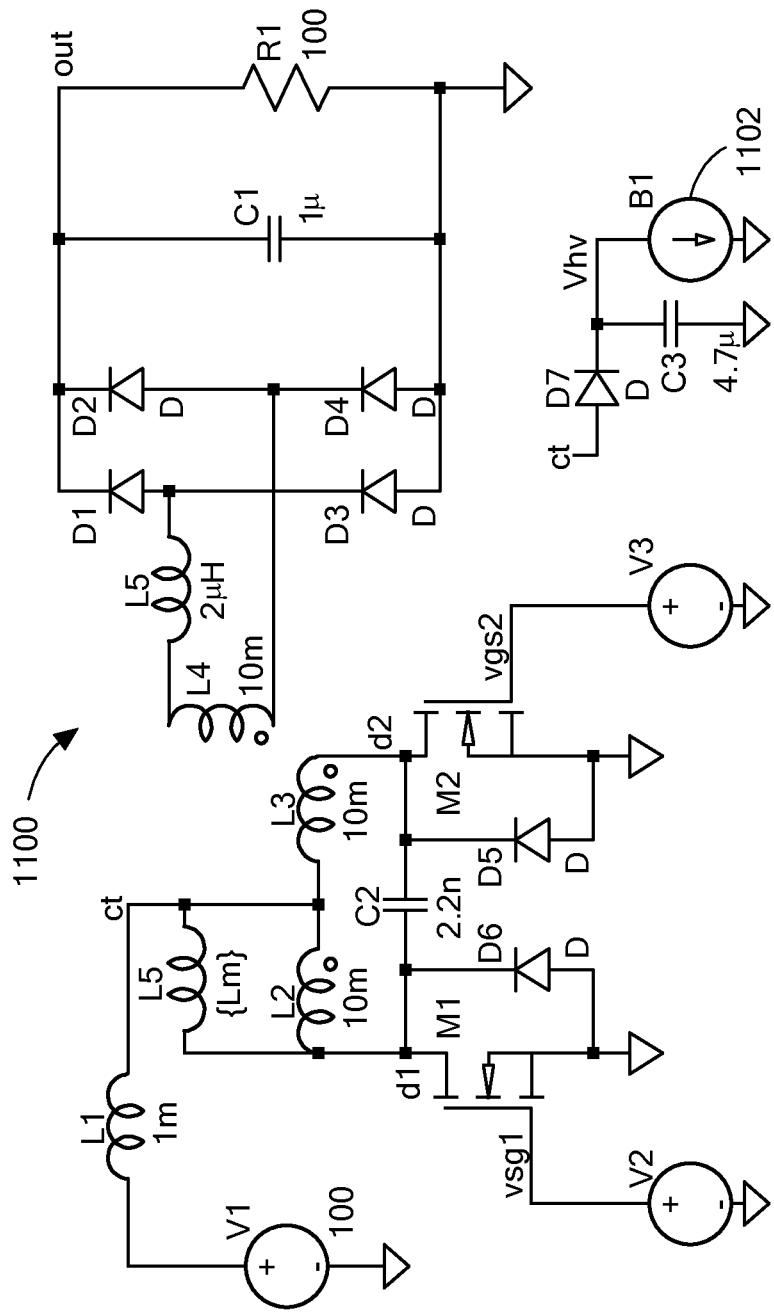

FIG. 11 shows a model 1100 illustrating features enabling useful properties of the power supply, including a diode coupled load clamp circuit 1102 on a center tap (ct) of the transformer, which includes a diode D7 and a capacitor C3. Systems needing a power supply providing an output power of this size typically also need an auxiliary power supply providing a lower power to support auxiliary functions, such as a DSP processor serving as the control module of the power supply, and the control circuitry of the amplifier being fed by the power supply. For example, the auxiliary power supply may deliver around 100 W to run all of the DSP signal processing and the low level functions of a powered system, such as an audio amplifier. By using this auxiliary power supply to absorb a significant amount of the leakage energy (e.g., energy due to leakage inductance), a power supply can have a push-pull circuit topology at relatively large output power levels without having to dissipate a correspondingly large amount of power due to the leakage energy. Instead of most of the leakage energy being lost to dissipation, a significant portion of the leakage energy is redirected to power one or more control modules. In the model 1100, this auxiliary power supply is represented by a current source B1 coupled to the clamp circuit 1102.

Figure 12:
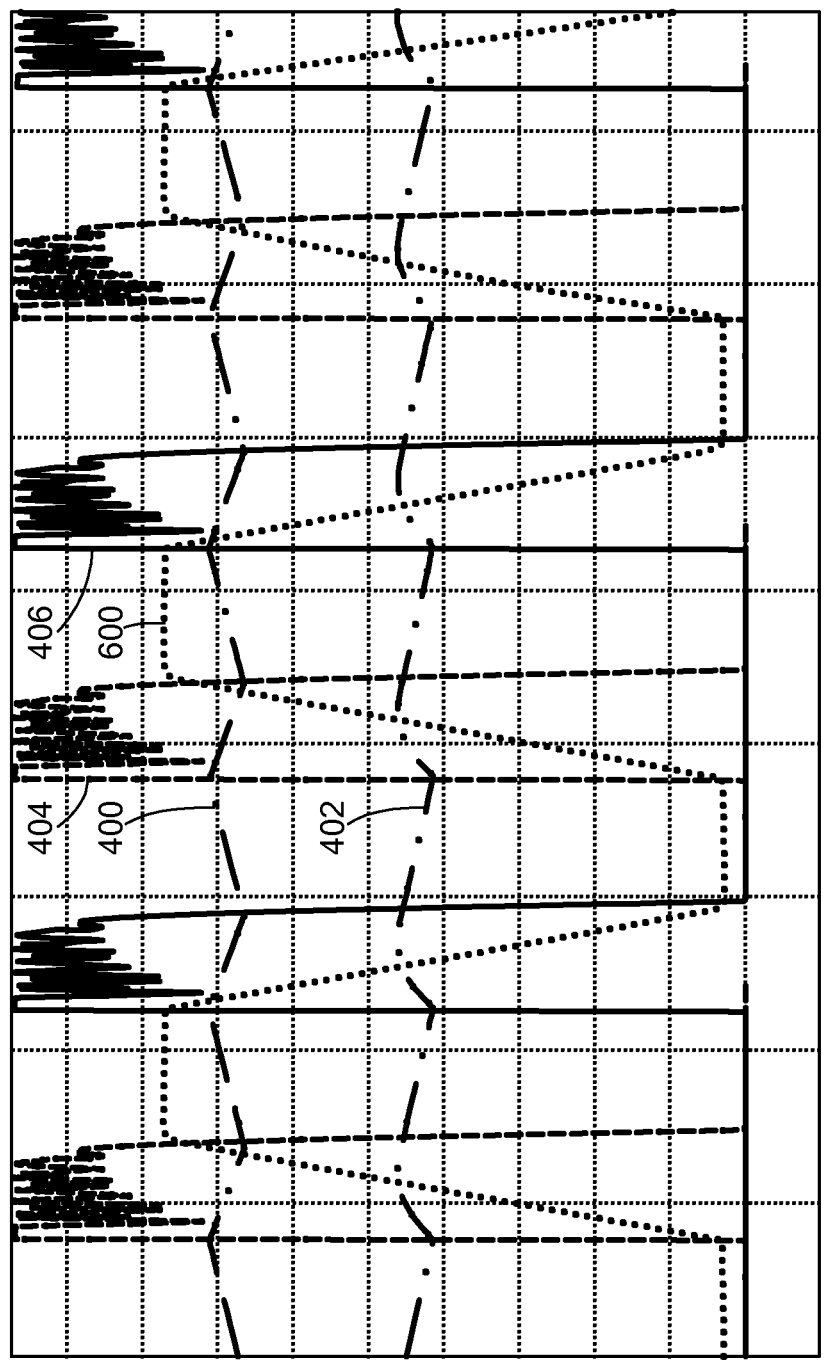

FIG. 12 shows waveforms resulting from a simulation based on the SPICE model 700 run under the same conditions as were used in the simulation resulting in the waveforms of FIG. 10, but with the clamp circuit 1102 coupled to the center tap (ct) of the transformer. These waveforms demonstrate that this clamp circuit 1102 effectively limits the drain voltages on the switches M1 and M2 to just about the same levels that would occur with an ideal transformer of the simulation resulting in the waveforms of FIG. 8, with the leakage energy used to power the auxiliary power supply. As described in more detail below, another use of this clamp circuit 1102 is to enable the startup procedure.

Without being limited by theory, one expression of the primary side energy (leakage energy from the primary winding not coupled to the secondary winding) to be absorbed by this clamp circuit 1102 each switching cycle is:

$$4L_{leak}\frac{I_{in}^2}{2}\frac{V_{clamp}}{V_{clamp}-V_{out}}$$

where all variables are referenced with respect to the transformer primary winding. The variable $I_{in}$ is the input current flowing into the inductor L1. The variable $L_{leak}$ is the leakage inductance. The variable $V_{clamp}$ is the voltage across the clamp circuit 1102. The variable $V_{out}$ is the output voltage across the output capacitor C1. When the power supply is switching at frequency F this results in a power delivered to the clamp circuit 1102 as follows.

$$4L_{leak}\frac{I_{in}^2}{2}\frac{V_{clamp}}{V_{clamp}-V_{out}}F$$

One consequence of this is that for some combinations of achievable leakage inductance $L_{leak}$ and some values of $I_{in}$ and switching frequency F the power supply may be delivering more power to the clamp circuit than the auxiliary power supply can absorb, or require a higher value of $V_{clamp}$ than the clamp circuit components can withstand.

Figure 13:
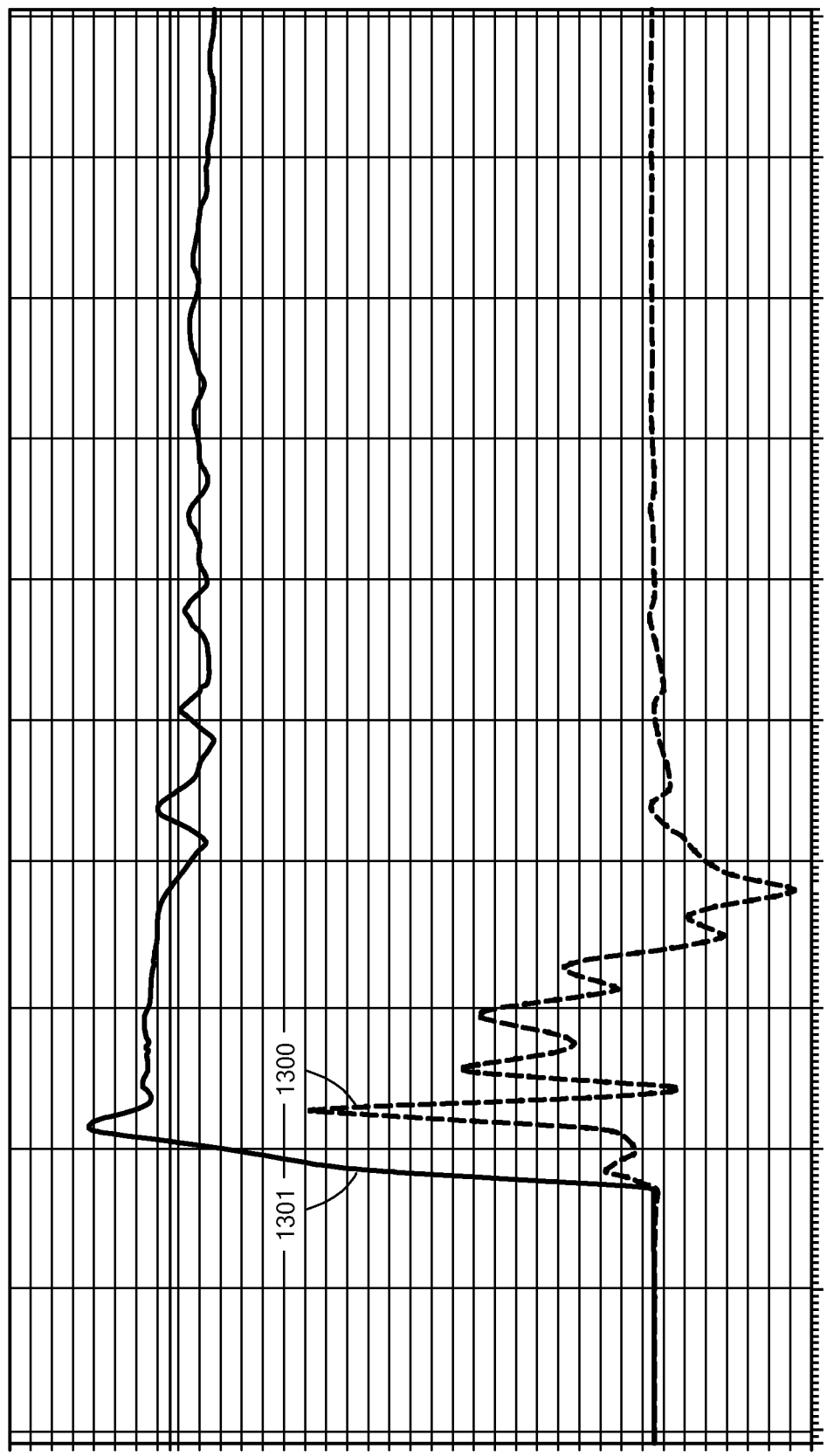
FIGS. 13-14, 17, 22A-22C, 23, 25-26, and 28 are plots of oscilloscope waveforms.
Figure 14:
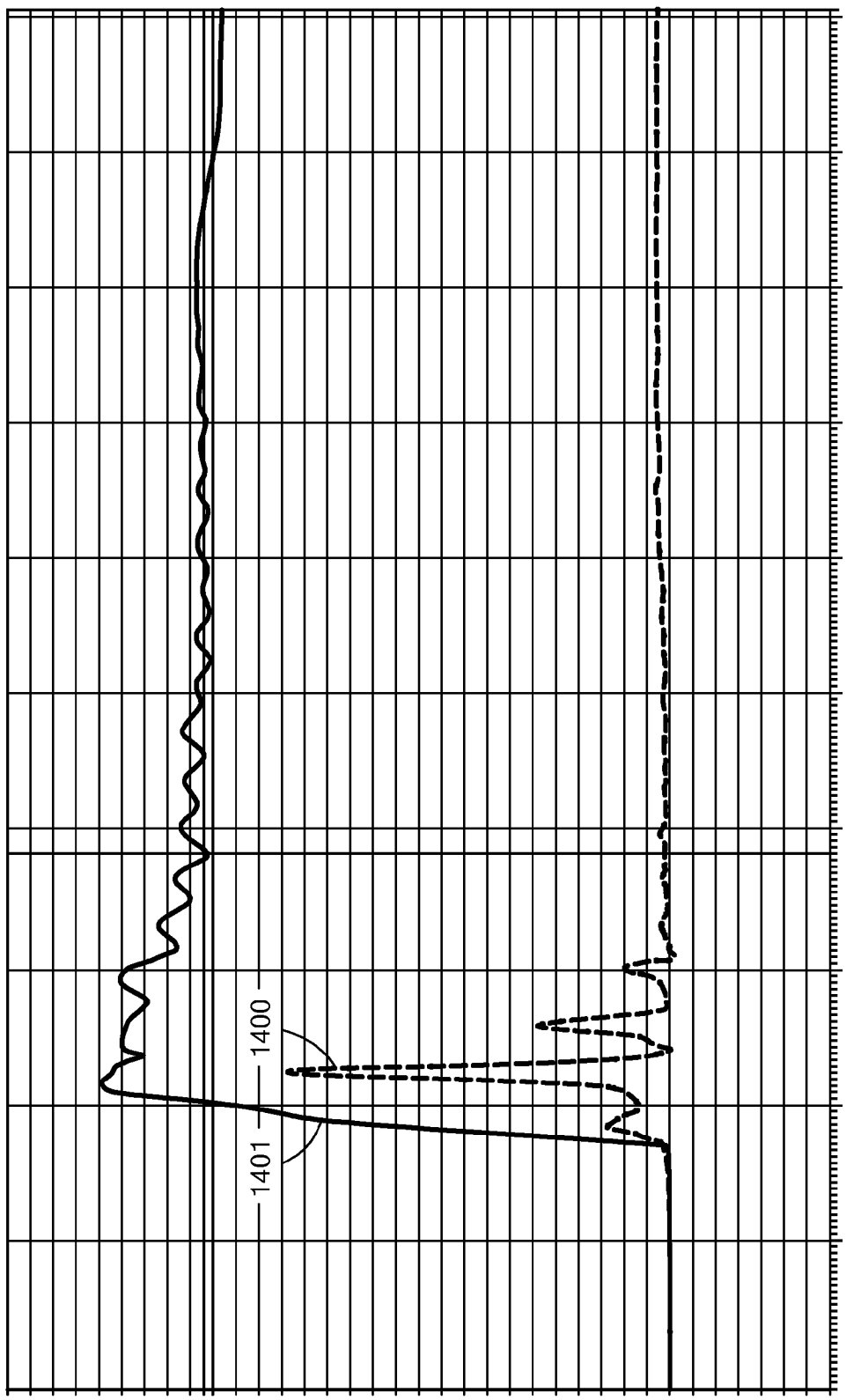

A non-ideal characteristic of real diodes is known as "reverse recovery," and is generally thought to be bad. When a minority carrier based PN diode is reverse biased after carrying forward current, it takes a finite time for the carriers to be depleted from the space-charge layer and the diode to hold off reverse voltage. Some state of the art diodes exhibit little or no reverse recovery. However, in some implementations of the power supply, reverse recovery can be exploited to return some of the leakage energy stored in the clamp circuit 1102 back through the center tap to the secondary side load, relieving the auxiliary power supply from having to use all of that leakage energy to power auxiliary control circuitry. The diode D7 in FIG. 11 is an example of such a diode selected to have a reverse recovery time in the range of about 200 ns to 800 ns. FIGS. 13 and 14 show waveforms from an oscilloscope captured from a prototype power supply at about a 3.3 kW output, but with a relatively slow diode D7 for the waveforms of FIG. 13 and a relatively fast diode D7 for the waveforms of FIG. 14. Waveforms 1300 and 1400 represent current through diode D7, and waveforms 1301 and 1401 represent a voltage at the center tap (ct) of the transformer, which is connected to the anode of diode D7. The two cases showed virtually the same operating efficiency curves, but the operating value of $V_{clamp}$ associated with the use of the slower diode was significantly reduced (30V) relative to the same prototype power supply with the faster diode. It can be seen that in the reverse recovery phase, the slower diode is releasing some of the energy stored in the capacitor of the clamp circuit 1102 back into the power supply circuit, where it is flowing through the secondary winding into the output of the power supply.

Other optimizations of the power supply associated with the values picked for the main inductor (L1 in FIG. 11) and the transformer magnetizing inductance (L5 in FIG. 11) help to limit this leakage energy by modifying the switching frequency F.

Figure 15:
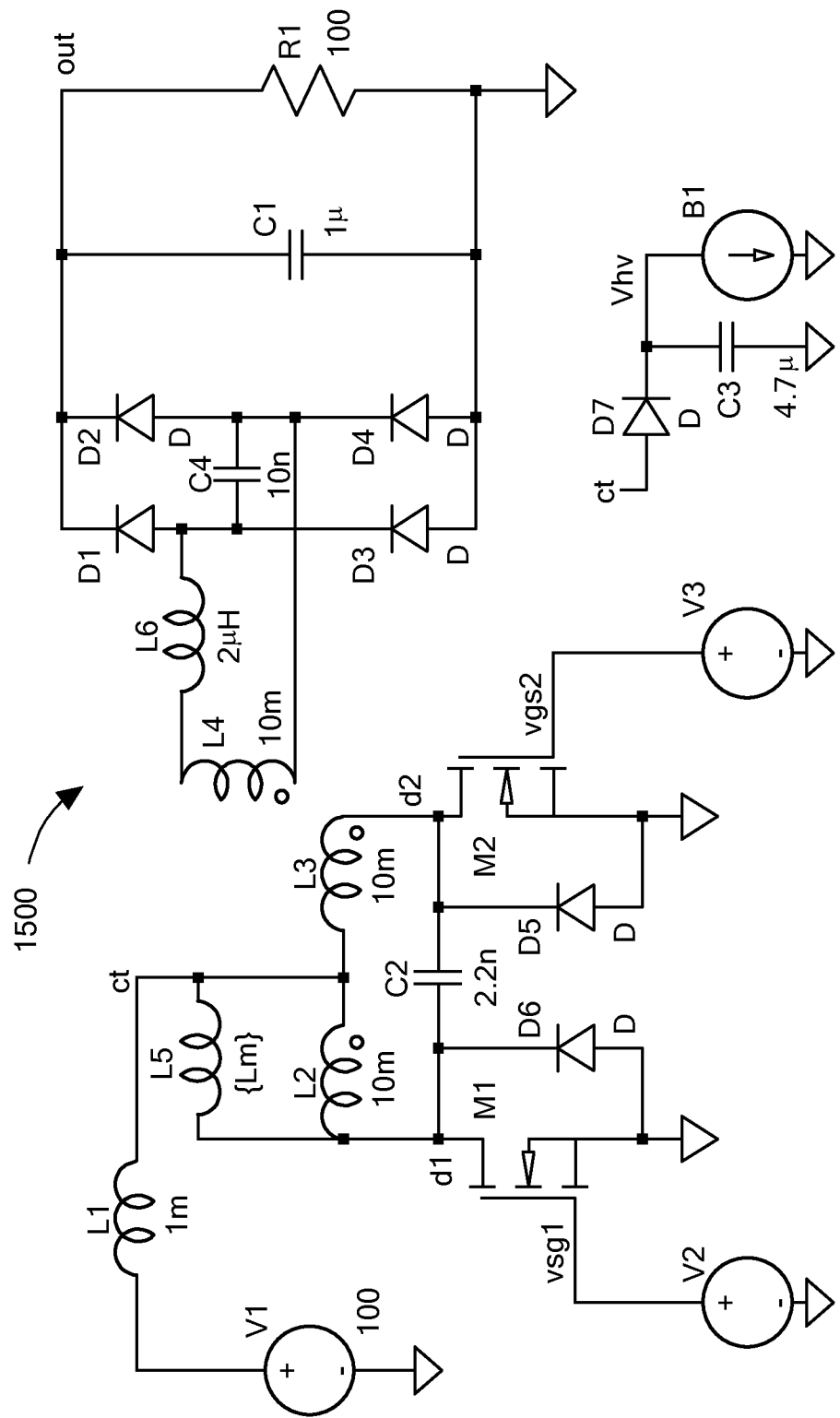
Figure 16:
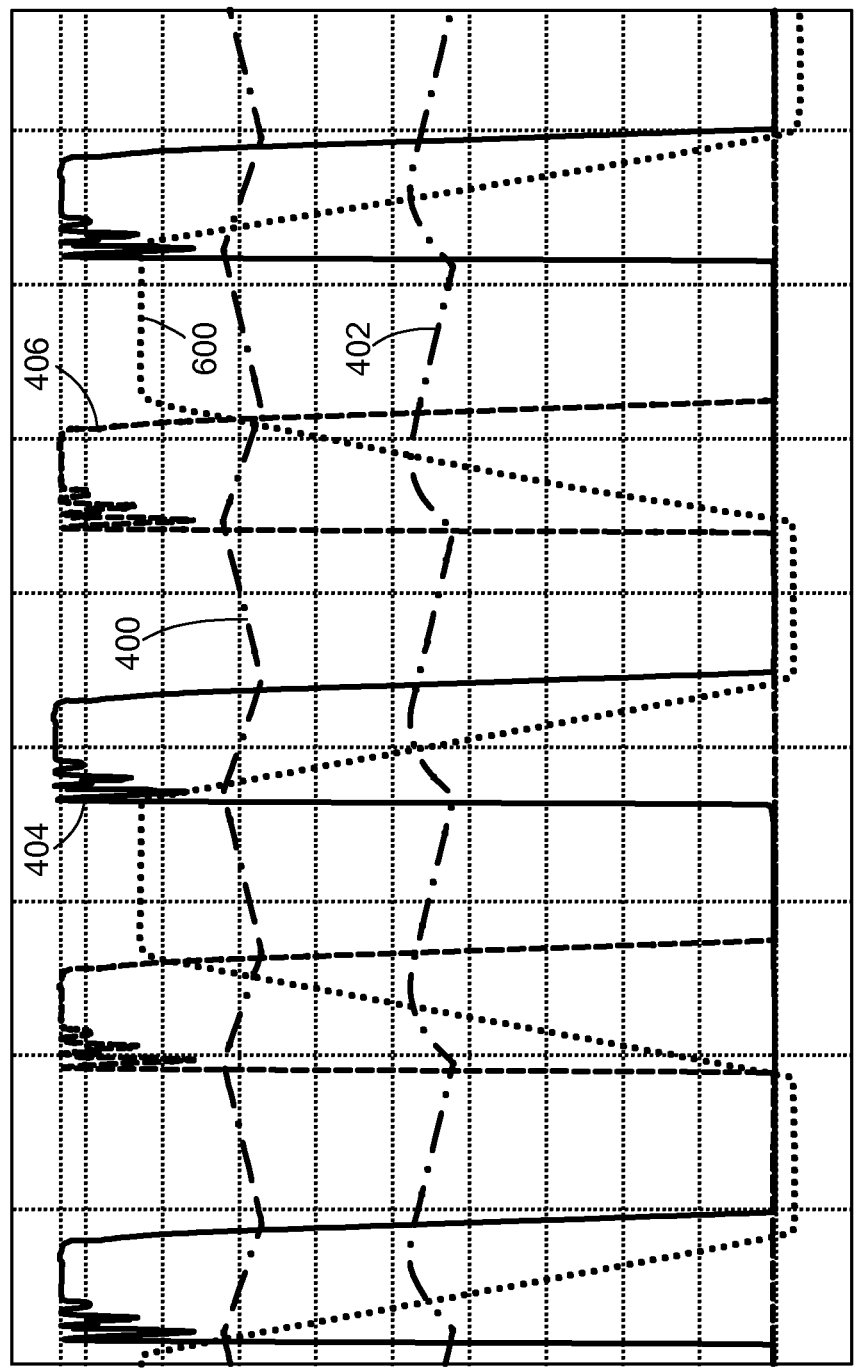

An additional circuit component is also able to help manage this leakage inductance effect. Adding capacitance directly on the secondary side of the transformer can reduce the energy absorbed by the clamp circuit 1102. In the following example, such a capacitance effectively reduces $V_{out}$ during the transition when the power supply is dumping energy into the clamp circuit 1102, which increases the denominator in the expression above, reducing the leakage energy to be absorbed. This is shown in FIG. 15, which shows a SPICE model 1500 with an addition of secondary side clamp capacitor C4. FIG. 16 shows waveforms corresponding to those in FIG. 12, but with the addition of the clamp capacitor C4—it can be seen that the peak voltage in FIG. 12 is 485.9V but in FIG. 16 only 467.3V.

Startup of a power supply (i.e., when the input is initially plugged into a source—an AC source or a DC source) may introduce special operating conditions, which may be managed by startup procedures performed using certain components and circuitry in the power supply under the control of control circuitry powered by the auxiliary power supply. In some power supplies, such as the power supply 100 shown in FIG. 1, a buck converter stage may be included mostly to allow a clean startup. In some power supplies, additional power handling components such as high powered resistors and/or high current silicon-controlled rectifier (SCR) switches and are used to manage startup—plugging the power supply into the AC line without these additional components may result in a large current spike as certain capacitors charge up, which can damage components and blow external fuses and circuit breakers. One of the advantages of the clamped current-fed push-pull circuit topology of some of the embodiments disclosed herein is that, with proper control, fewer additional power handling components (or none) are required to start up the power supply. Some schemes for starting up a push-pull topology require additional windings on the main inductor, which also suffer from leakage inductance related voltage spiking, which may require additional circuitry to mitigate the voltage spiking. However, using the startup schemes disclosed herein, embodiments of the push-pull topology power supplies disclosed herein do not require such additional circuitry.

Figure 17:
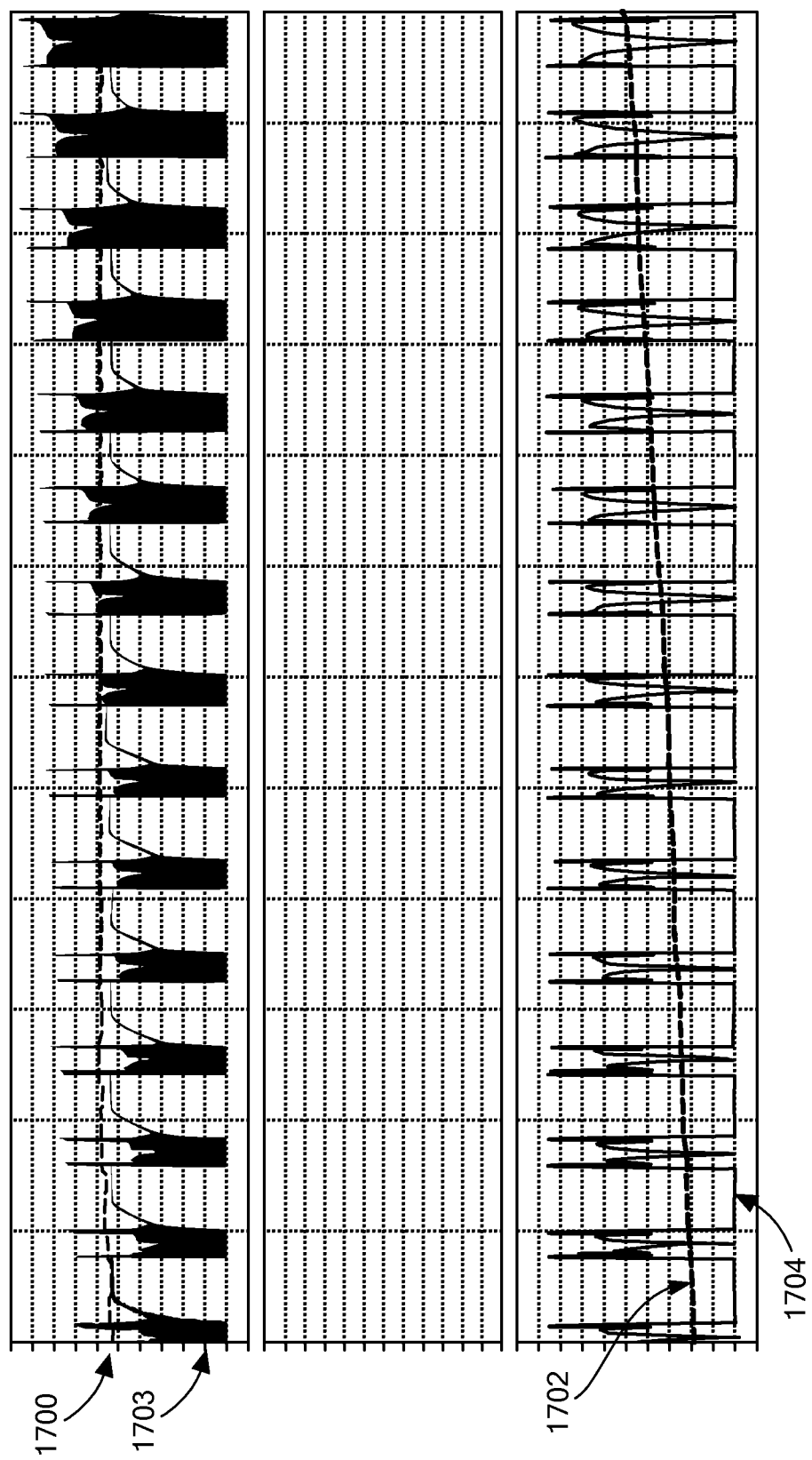

One aspect of an exemplary startup scheme is that, in a PFC application, the AC line periodically crosses through 0V, and some implementations of this push-pull topology have virtually no capacitive energy storage on the primary side of the transformer. This allows the power supply to start by transferring energy to the secondary side of the transformer only around the line crossing events, and gradually opening up the phase angle (also called "current conduction angle") as the output voltage rises to its steady state value. The clamp circuit on the center tap (including diode D7 in FIG. 15) also plays a role in absorbing energy stored in the main inductor (inductor L1 in FIG. 15). Recall that, in this topology, the current in the main inductor L1 is not controllable when the reflected center tap voltage is less than the input voltage. Thus, when starting at 0 output voltage the power supply cannot transfer any power without ramping the current in L1 (e.g., ramping monotonically). With the presence of the clamp circuit, the power supply can periodically turn off both switches, dumping the energy in the main inductor L1 into the clamp capacitor. Of course, there is a limited amount of energy and power that can be absorbed by the clamp circuit, but control circuitry can be configured to manage the leakage energy consistent with those limits. A startup procedure that has as its inputs measurements of the input AC line voltage, output DC voltage, clamp voltage and current in the main inductor is capable of respecting all these limits and starting up the power supply cleanly with no additional power handling components. FIG. 17 shows a group of waveforms resulting from a SPICE model simulation of an example startup procedure. FIG. 17 shows the clamp voltage 1700 (Vhv in FIG. 15) held at 420V as the output voltage 1702 (V(out) in FIG. 15) increases from about 70V to 196V, with a 375V peak AC line input (worst case European high line, which is the most difficult case for startup). The increasing conduction angle as the output voltage increases can be seen (1703 (V(D1) in FIG. 15), 1704 (I(L1) in FIG. 15)).

Figure 18:
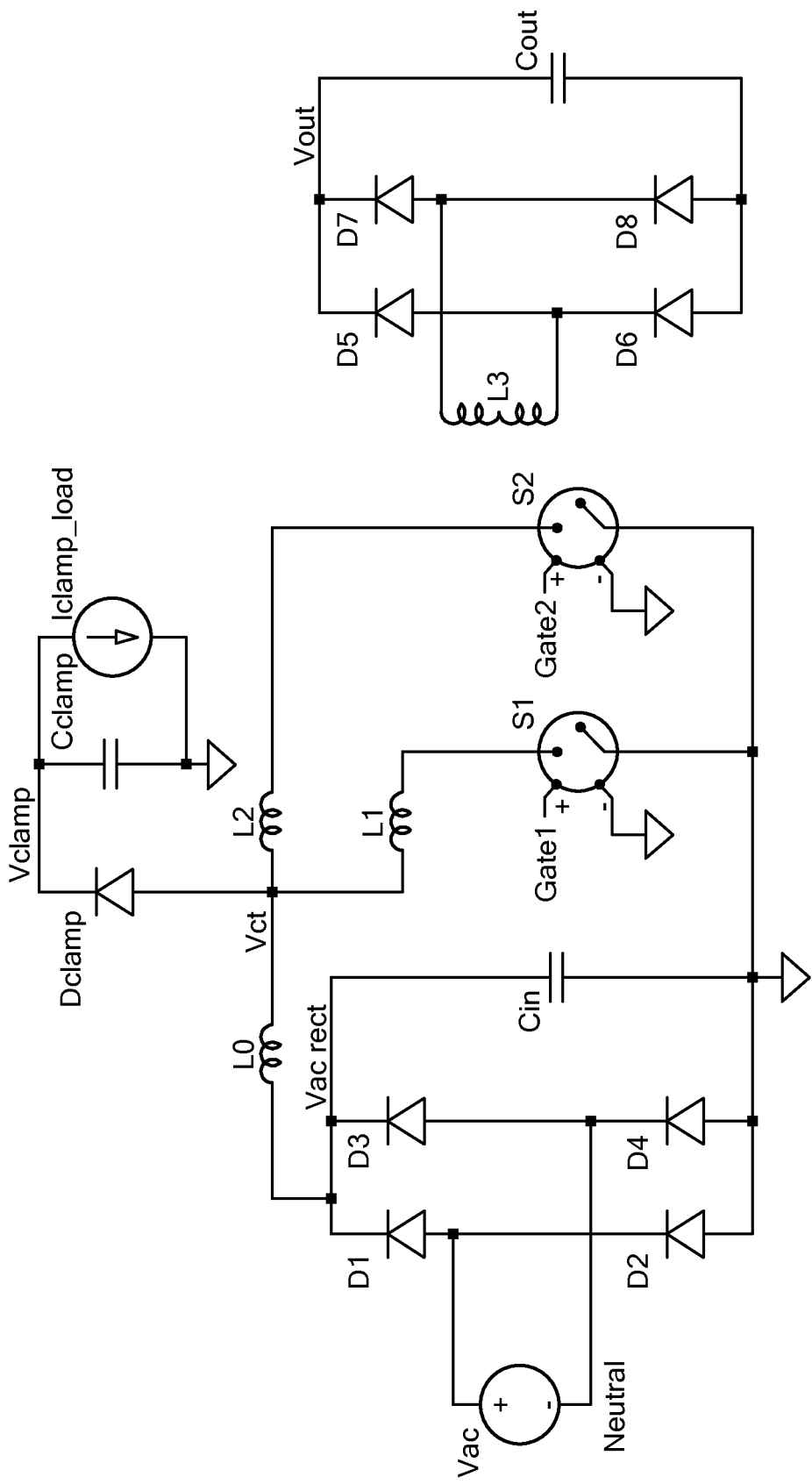
FIG. 18 is a circuit diagram of a single-stage power supply.

A simplified circuit diagram representing the power supply 200 is shown in FIG. 18. The example startup procedure is able to manage the inrush current problem encountered in various kinds of current-fed isolated power supplies. Some circuit elements can be implemented using multiple discrete elements combined into a circuit that serves a desired function. For example, any of the capacitors, including the output capacitor $C_{out}$, can be implemented using a capacitor bank.

Figure 19:
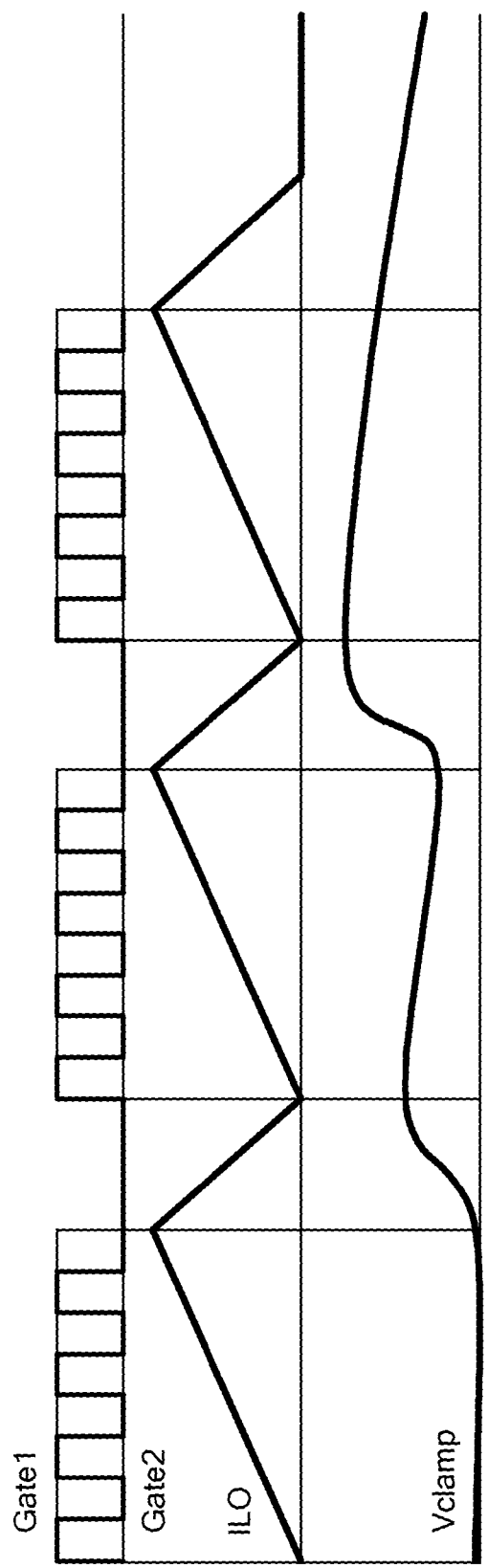
FIGS. 19-20 are sets of plots of a startup procedure.

The operation of switches S1 and S2 is accomplished through pulse-width modulated (PWM) signals coming from a control module (e.g., a mixed analog/digital processor). One example of such signals includes two PWM sequences 180° out of phase but having the same switching period $T_{sw}$. An analog comparator is used to stop both sequences, by keeping both switches open, when the monitored current in the main inductor L0 reaches a maximum predefined threshold. The opening of both switches is necessary to prevent excessive current during the time when the center tap voltage (i.e., the voltage reflected to the primary side of the transformer, labeled $V_{ct}$) is smaller than the instantaneous line voltage $V_{ac}$. The current then starts to decay as it charges the clamp capacitor $C_{clamp}$ through diode $D_{clamp}$, causing the voltage $V_{clamp}$ to increase as shown in FIG. 19. FIG. 19 shows waveforms associated with the startup procedure, including a Gate 1 PWM sequence of states for switch S1, a Gate 2 PWM sequence of states for switch S2, main inductor current $I_{L0}$, and the clamp voltage $V_{clamp}$. The PWM sequences, when enabled, alternate between a (high) closed state, and a (low) open state. The PWM sequences are then disabled with both switches in the (low) open state. The PWM sequences are restarted when the inductor current $I_{L0}$ reaches a minimum predefined threshold, which can be indirectly obtained by calculating the decay time from measurements of the voltage developed across inductor L0. It is possible for $V_{clamp}$ to increase beyond the rated voltage of the capacitor $C_{clamp}$, so the control module is configured to manage the time that the switches S1 and S2 are in operation and stopped, such that $V_{clamp}$ remains regulated below a maximum predetermined value.

Figure 20:
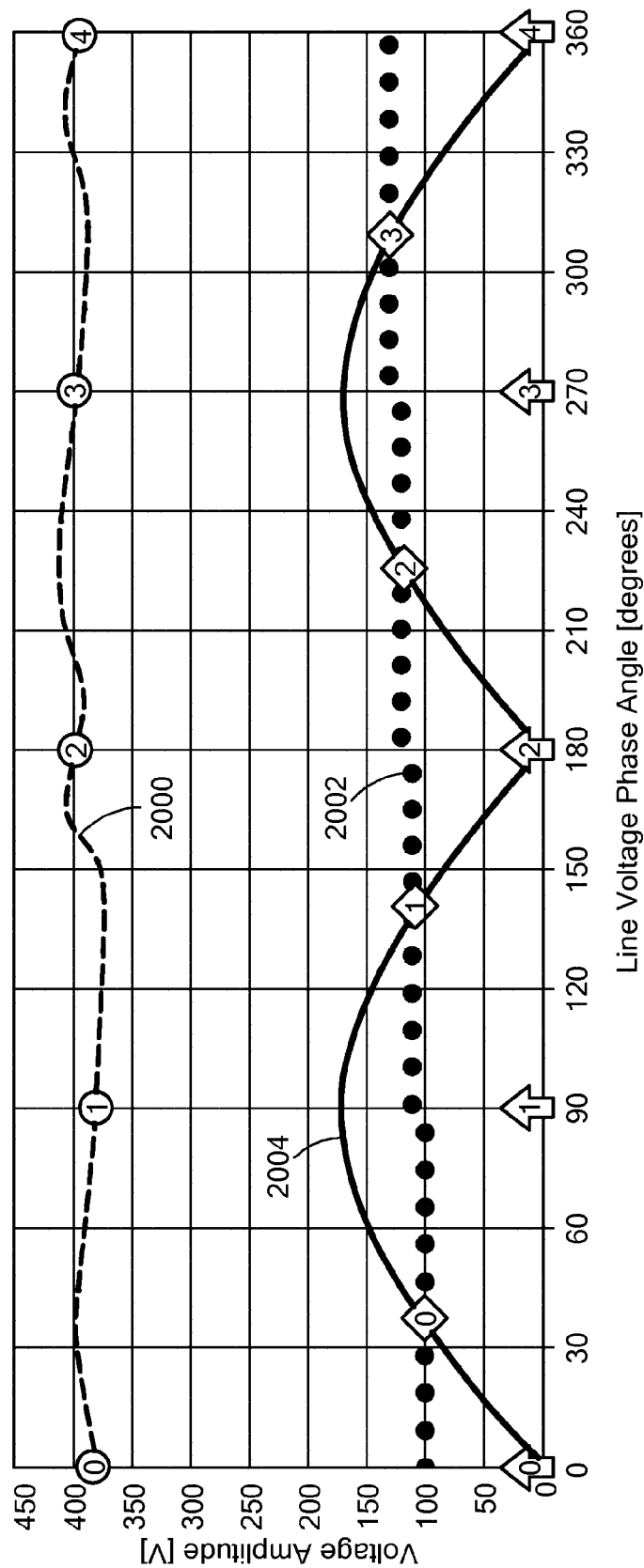

Referring to FIG. 20, labels on three waveforms are associated with the initiation of control tasks performed by the control module when performing the startup procedure. In this example, control task initiation times corresponding to peaks and zeros of a rectified AC line voltage are represented by the arrows numbered 0, 1, 2, etc. Each time a control task executes, the control module runs a Proportional+Integral (PI) controller sub-module to keep the clamp capacitor voltage (represented by the dashed waveform 2000) regulated around a reference value of 400V. Voltages of the clamp capacitor at the task initiation times are represented with circular labels numbered 0, 1, 2, etc. The output of the PI controller sub-module (represented by the dotted waveform 2002) provides the voltage levels at which the sequences controlling the switches S1 and S2 should be enabled and disabled during each AC quarter cycle. Crossings between the rectified AC line voltage (represented by the continuous waveform 2004) and the output of the PI sub-module are represented with the diamond shaped labels numbered 0, 1, 2, etc. When the descending portion of the rectified AC line voltage crosses an odd-numbered voltage level the sequences controlling the switches are enabled and when the ascending portion of the rectified AC line voltage crosses an even-numbered voltage level the sequences controlling the switches are disabled.

Figure 21:
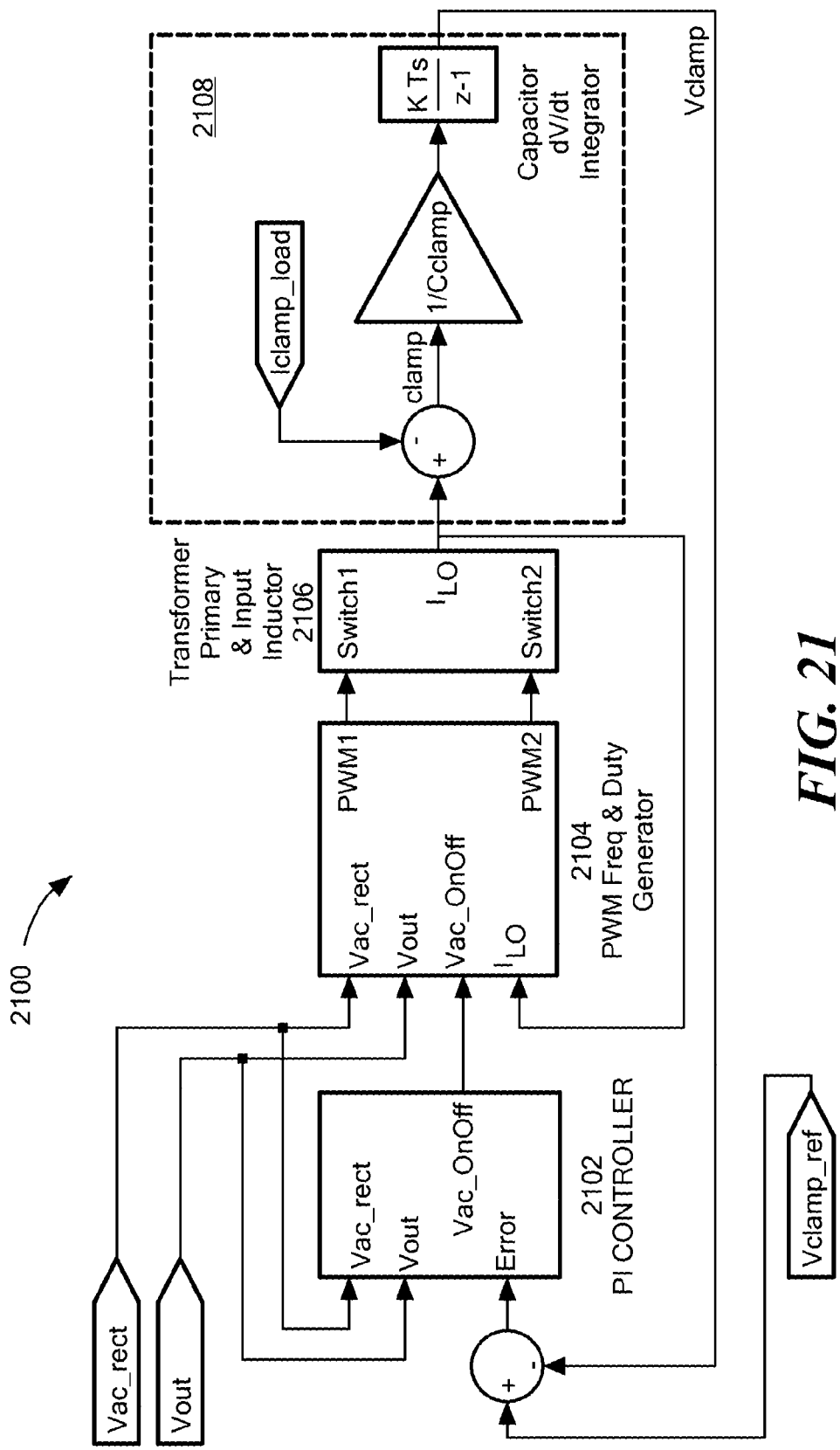
FIGS. 21 and 29 are block diagrams of control circuitry.

FIG. 21 shows a block diagram of an example of a control module 2100. A PI controller sub-module 2102 receives as input the rectified AC line voltage $V_{ac\_rect}$, the converter output voltage $V_{out}$, and an Error signal that is the difference between a clamp reference voltage $V_{clamp\_ref}$ and the measured clamp voltage $V_{clamp}$. The output voltage $V_{out}$ can be used in combination with the output of the PI controller sub-module 2102 to establish a feedforward control path and to set limits for the enable/disable voltage levels, thus allowing the output capacitor to reach the nominal voltage faster. A PWM generator sub-module 2104 is responsible for creating the logic signals that are sent to control the main switches S1 and S2. The sub-module 2104 uses the rectified input voltage and the output voltage to vary the frequency of the generated pulses and also performs the calculations used to create the current reference and hysteresis band in the peak mode control of the inductor current. A block 2106 represents coupling between the control module 2100 and the rest of the power supply, including inputs to block 2106 representing inputs to the switches S1 and S2, and output from the block 2106 representing a current monitor that sense the main inductor current $I_{L0}$. A block 2108 represents a simplified circuit model of the effect of the clamp capacitor and load on the clamp voltage $V_{clamp}$ in response to the inductor current $I_{L0}$.

Figure 22A:
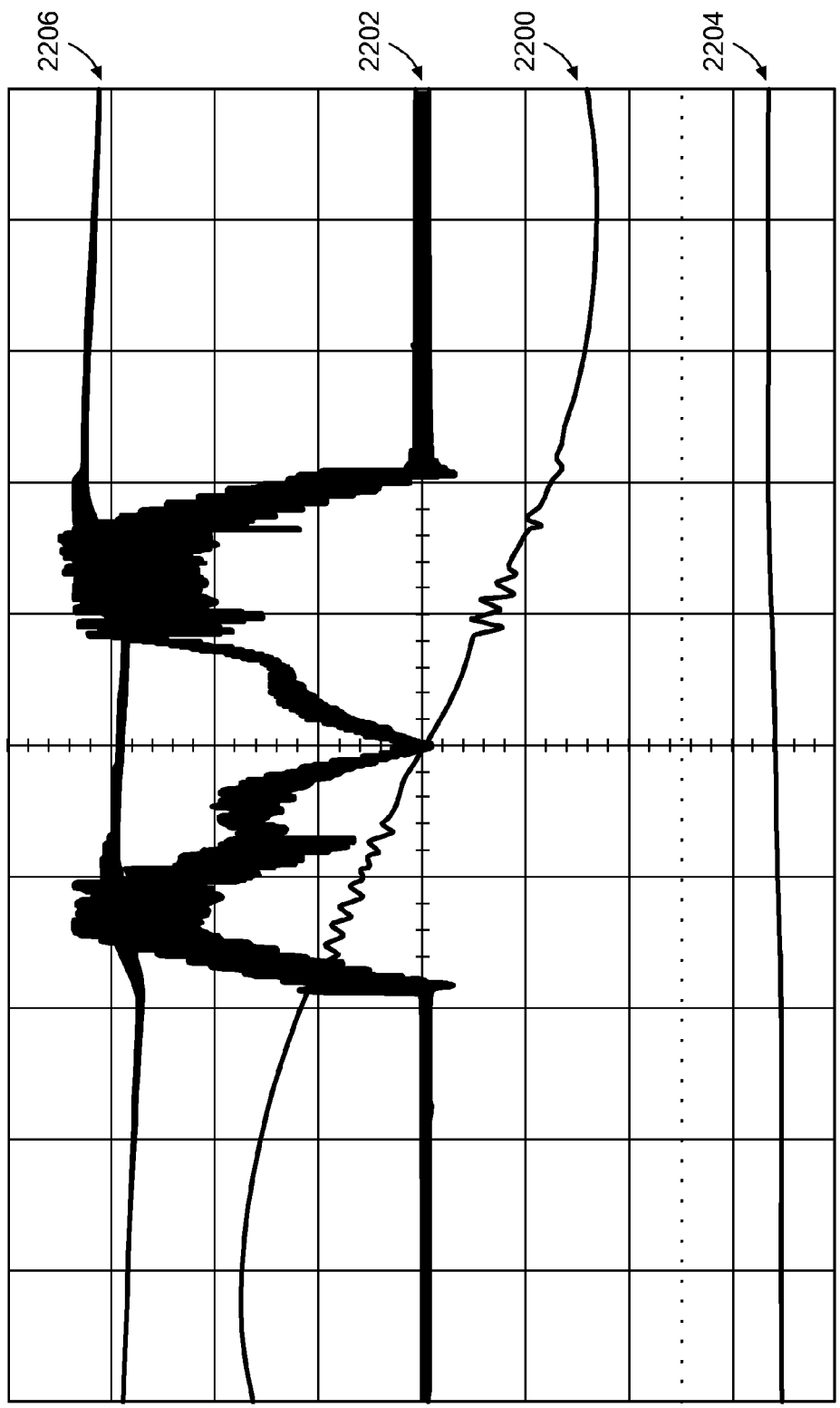

FIG. 22A shows waveforms from an oscilloscope typical of the startup algorithm in operation. In order to reduce the disturbances on the AC line voltage 2200 caused by enabling or disabling the algorithm during each AC quarter-cycle, the commanded inductor current 2202 is ramped up and down instead of using an abrupt step current command. Both the magnitude and slope are chosen by the control module 2100 as a compromise between the amount of disturbance generated and the amount of resulting voltage 2204 across the output capacitor and voltage 2206 across the clamp capacitor. The amplitude of the AC line voltage 2200 is 120 Vrms, and its frequency is 60 Hz.

Figure 22B:
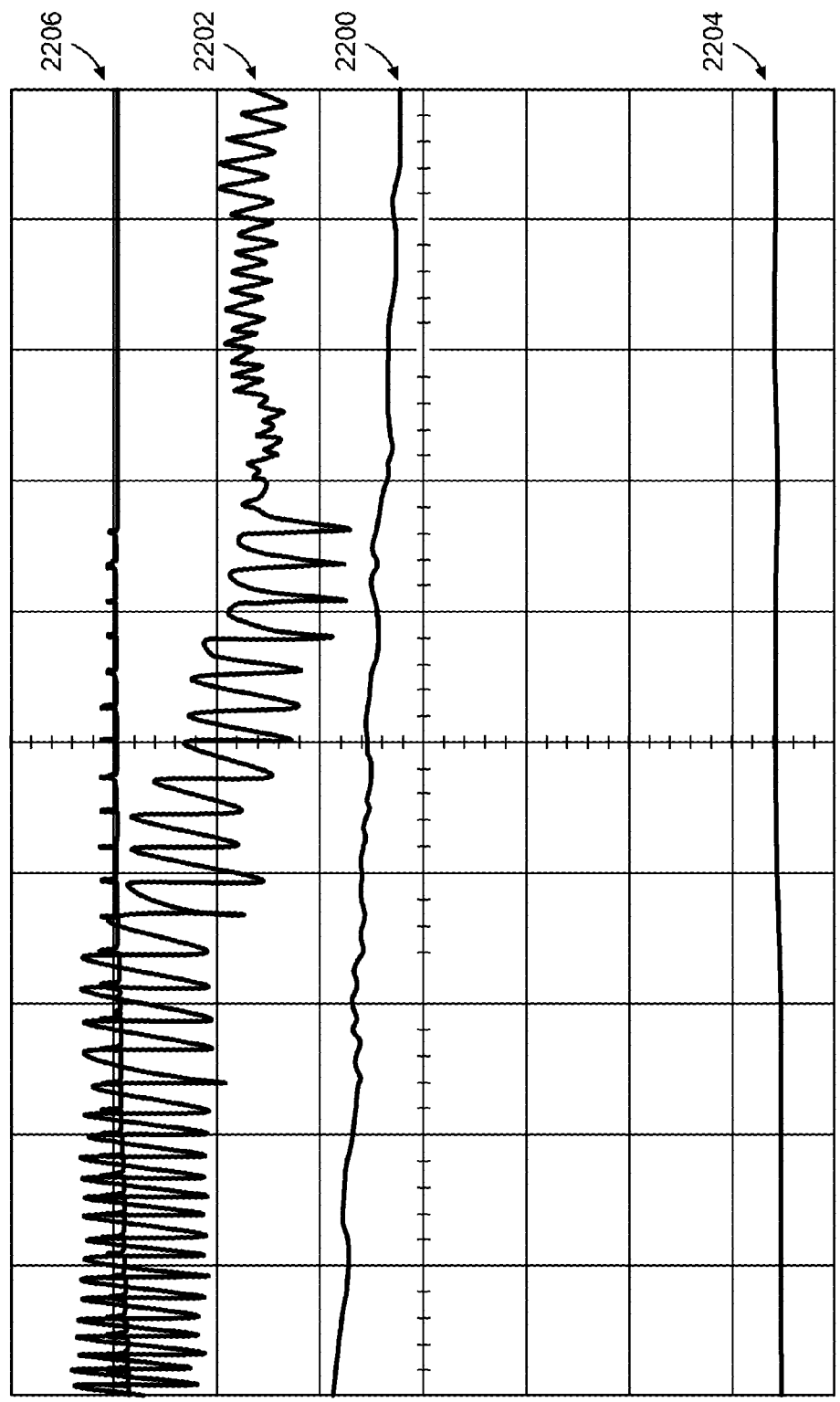
Figure 22C:
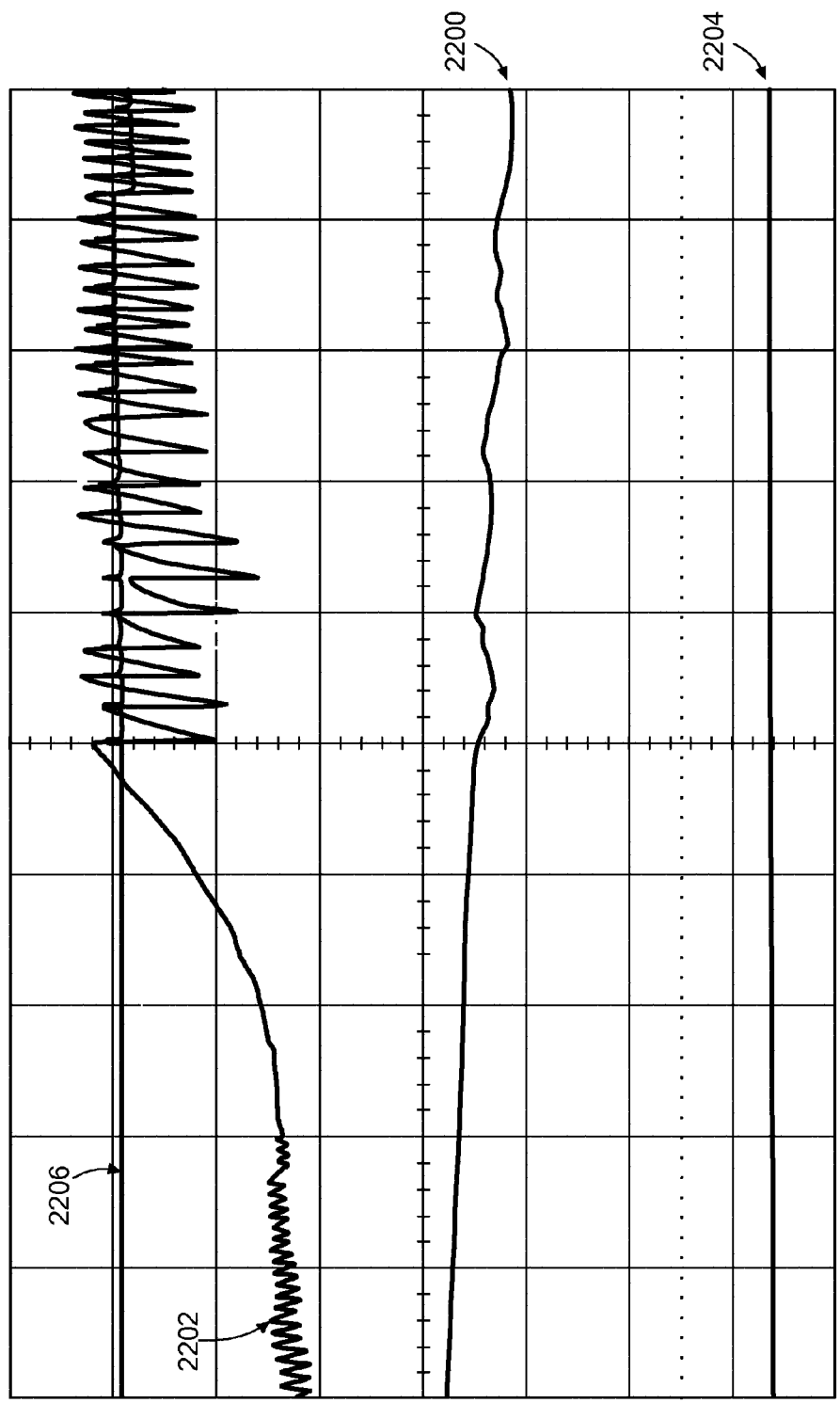

In FIGS. 22B and 22C, zoomed in views of the waveforms of FIG. 22A are shown. FIG. 22B shows the waveforms during a decreasing rectified AC quarter-cycle, and FIG. 22C shows the waveforms during an increasing rectified AC quarter-cycle. Around the zero crossing of the AC line voltage 2200 (shown before rectification) the inductor current 2202 will take longer to reach the current reference, if at all, and will excite the line impedance with lower frequencies. Therefore, in order to reduce oscillations on the AC line voltage 2200 during startup with a high line impedance, the minimum frequency of the hysteretic current control is limited by imposing a minimum enabled on-time $T_{on}$=25 uS. When the measured inductor current 2202 falls below a certain threshold the switches S1 and S2 no longer need to be both disabled and will continuously operate at a minimum 50% duty-cycle and minimum frequency so as to maximize the energy transfer to the output capacitor. During all the time when the AC line voltage 2200 is below the reflected output voltage and at the expense of more complexity, a higher energy transfer could be obtained by operating the switches S1 and S2 in a controllable quasi-resonant mode.

Figure 23:
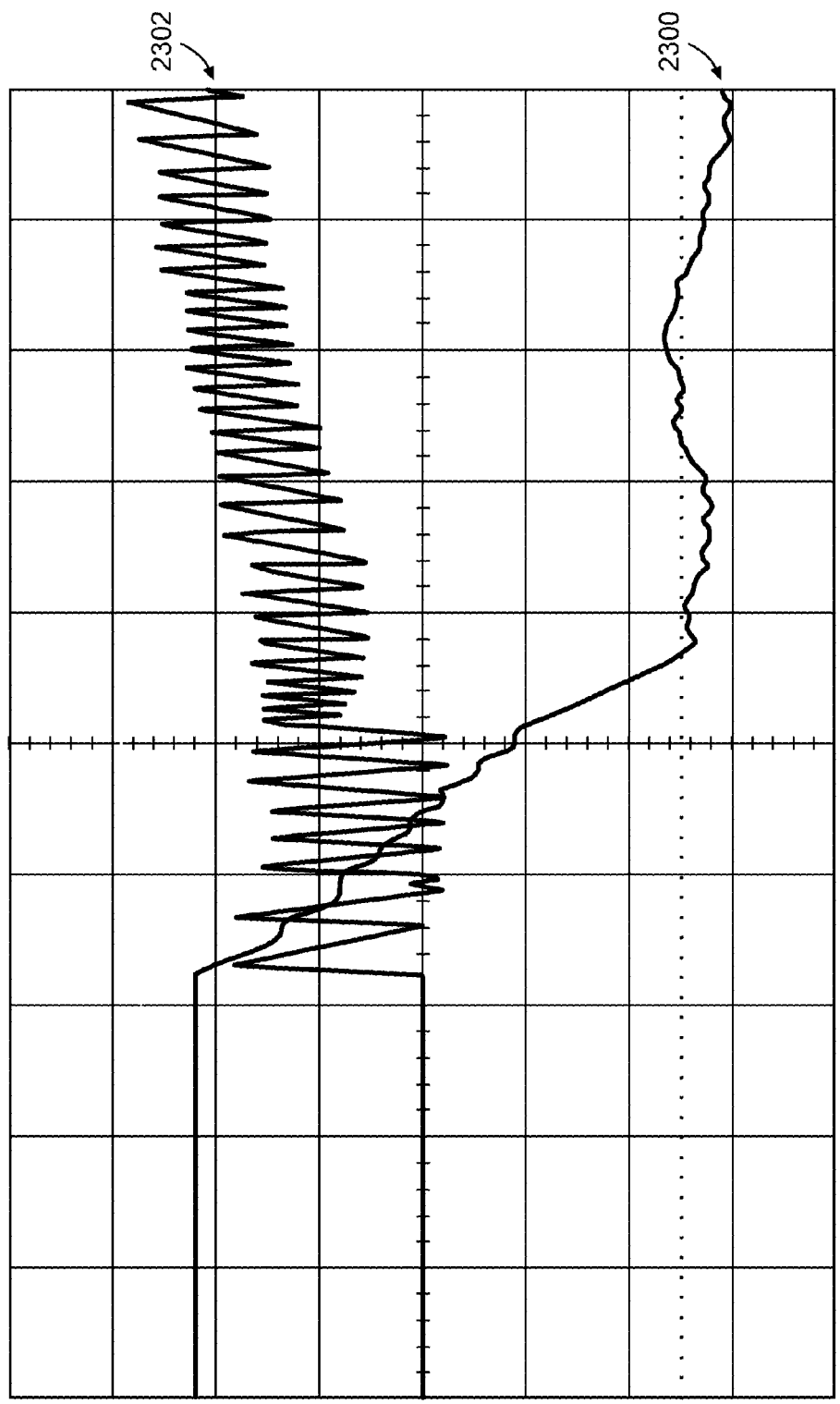

Another level of complexity is imposed by the presence of the input capacitor $C_{in}$ placed right after the AC line rectifier. The capacitor $C_{in}$ is added to attenuate the noise created by the high frequency ripple in the inductor current $I_{L0}$. However, $C_{in}$ may be charged with the AC line voltage peak while the switches S1 and S2 are turned off and therefore its voltage is monitored by the control module. FIG. 23 shows waveforms illustrating an example of the calculation of both switches off time $T_{off}$ during the initial discharge of the input capacitor $C_{in}$ based on measurements of $(V_{clamp}-V_{Cin})$. The waveform 2300 is the input capacitor voltage $V_{Cin}$, and the waveform 2302 is the main inductor current exhibiting a negative slope during the time $T_{off}$. The input capacitor voltage $V_{Cin}$ 2300 is sampled after each current peak, but $T_{off}$ is only being updated once every 25 uS, which explains why the current dwells around 0 A when an old $T_{off}$ in effect is greater than what it should be for $V_{Cin}$ at that exact point in time. The current hysteresis band could be adaptively commanded with a larger value to discharge the capacitor faster without causing the line voltage to sag, later returning to a lower current command once the input capacitor voltage reaches the AC line voltage level. In this example, amplitude of the AC line voltage is 220 Vrms, and its frequency is 50 Hz.

When $V_{ct}$ is greater than the AC line voltage, the limiting of the current is obtained without both switches S1 and S2 having to be stopped. Therefore, when the AC line voltage traverses the controllable current region, the control module is able to modify the PWM sequences in order to increase the energy transferred to the transformer output capacitor $C_{out}$. At the expense of more analog and digital processor resources the power supply could enter ZVS (zero-voltage switching) operating mode with peak current mode control, but an alternative solution could be achieved with less control module management by applying the principle of Volt-Second balance on the inductor L0. Since a current increase ΔI happens when the entire voltage $V_{ac}$ is applied across the inductor L=L0 according to $$V_{ac} = L \frac{\Delta I_{on}}{T_{on}} \Rightarrow T_{on} = L \frac{\Delta I_{on}}{V_{ac}}$$

and during the time when either switch is not conducting current, the relationship becomes $$V_{ac} - V_{ct} = L \frac{\Delta I_{off}}{T_{off}} \Rightarrow T_{off} = L \frac{\Delta I_{off}}{V_{ac} - V_{ct}}$$

Therefore the switching period is $$T_{sw} = T_{on} + T_{off} = L \frac{\Delta I_{on}}{V_{ac}} + L \frac{\Delta I_{off}}{V_{ac} - V_{ct}}$$

Figure 24A:
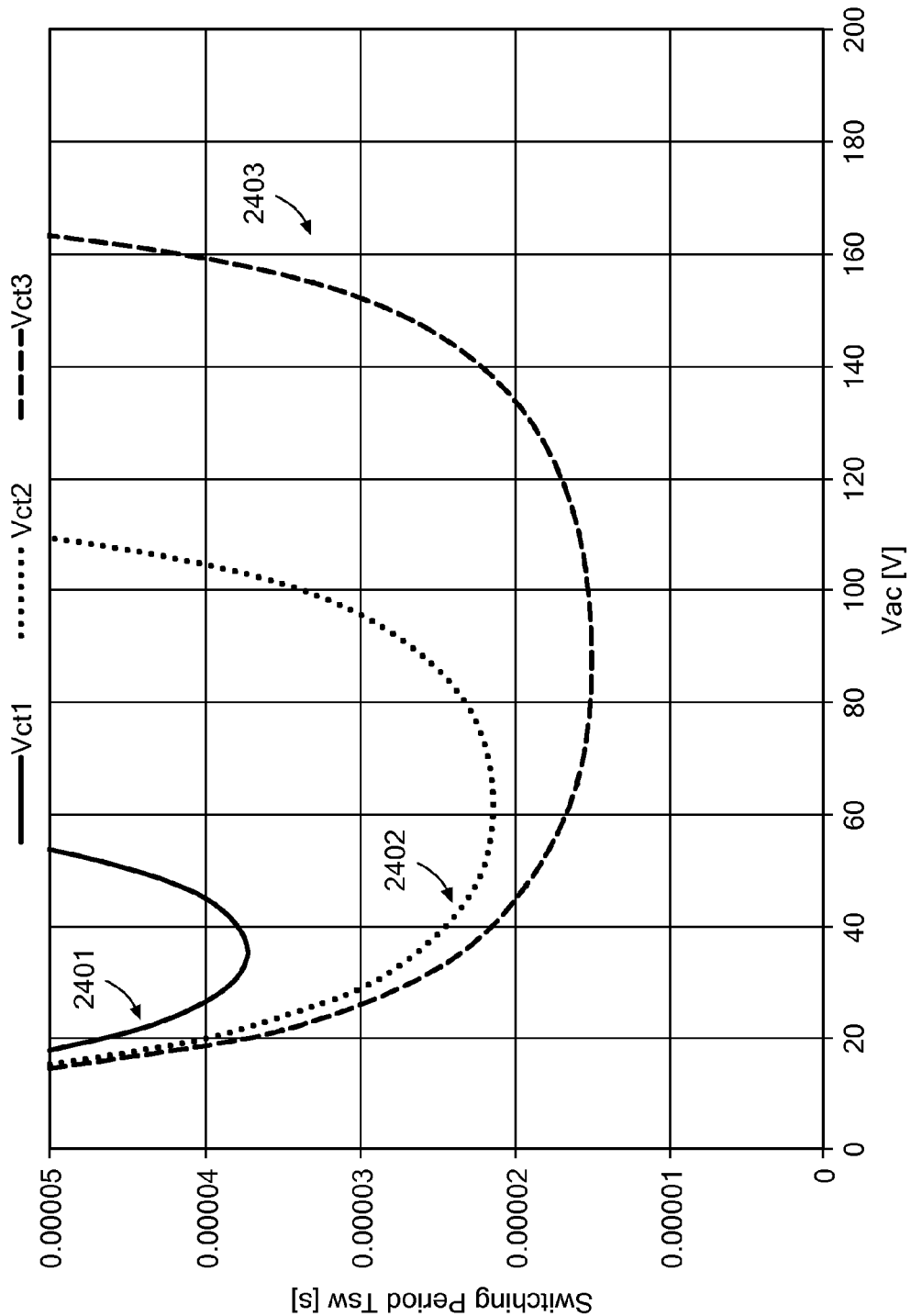
FIGS. 24A-24C are curves for equations representing circuit function.
Figure 24B:
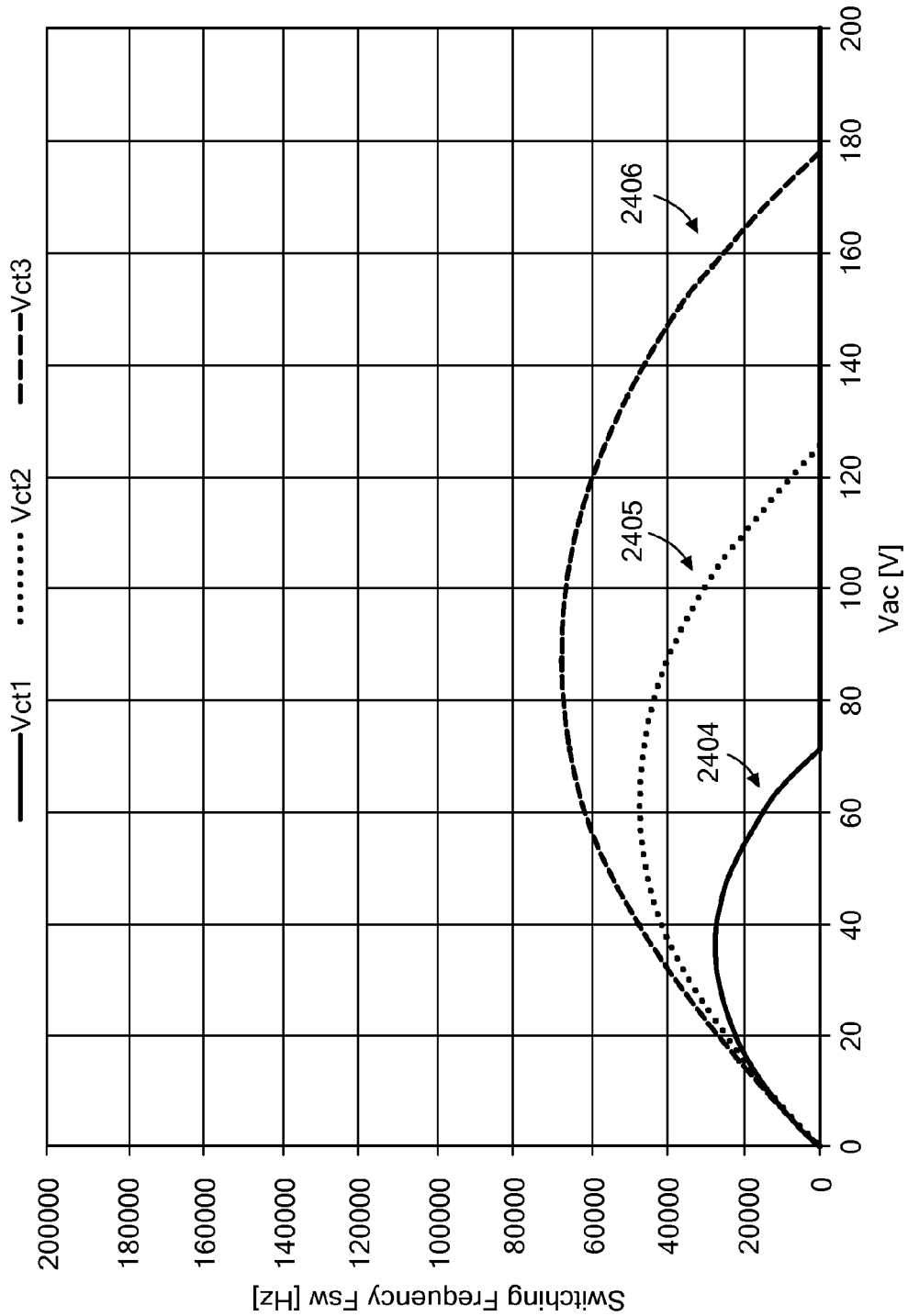
Figure 24C:
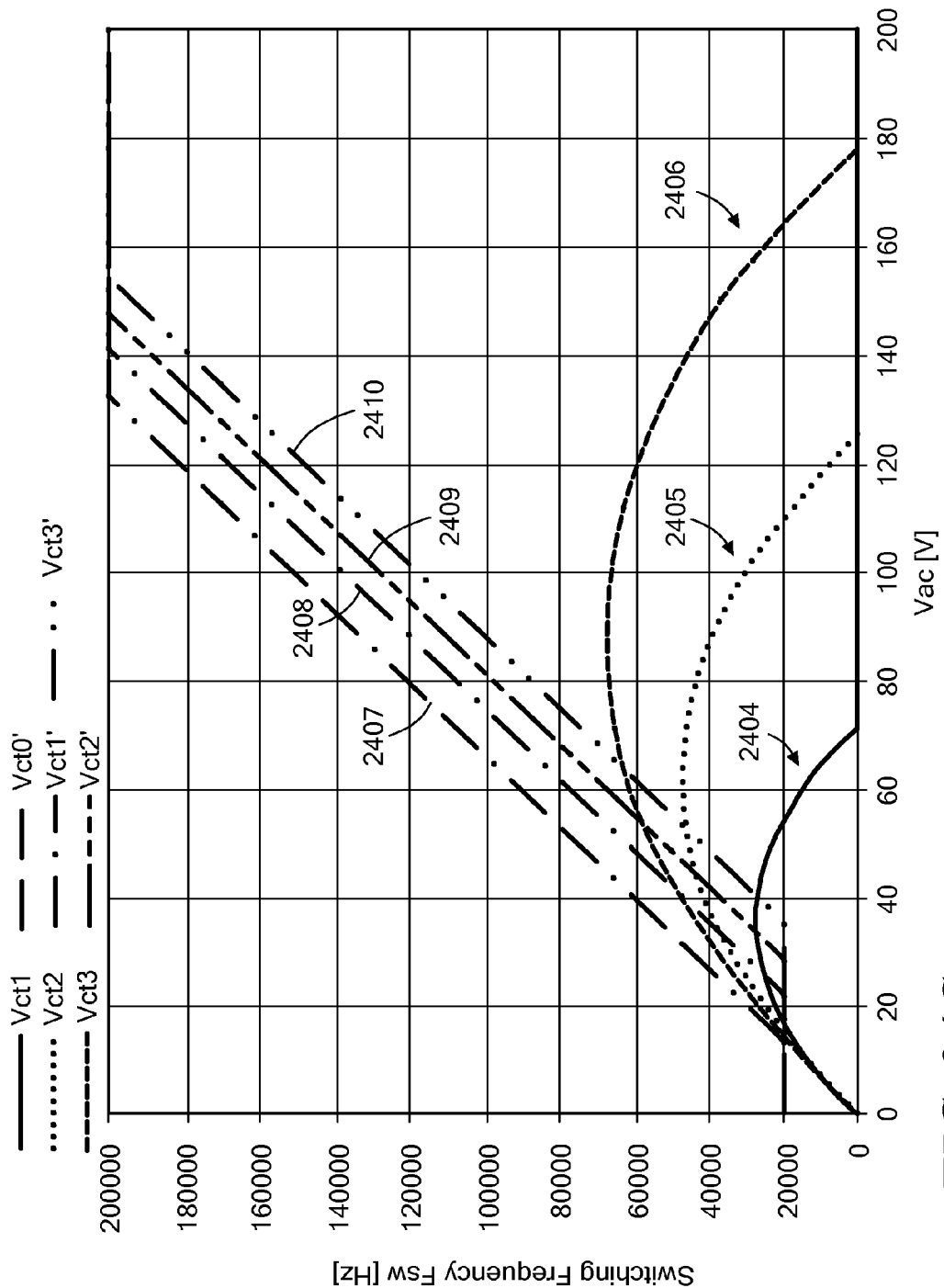

FIG. 24A shows $T_{sw}$ curves 2401, 2402, and 2403 for $V_{ct1}$, $V_{ct2}$, and $V_{ct3}$, respectively, where $L\Delta I_{on}=L\Delta I_{off}$ with $V_{ct}$ as the varying parameter where $V_{ct1}<V_{ct2}<V_{ct3}$. The corresponding frequency curves 2404, 2405, and 2406, respectively, are shown in FIG. 24B. As it can be seen, the relationships are nonlinear and only valid when $V_{ac}<V_{ct}$. Outside this range, when $V_{ac}>V_{ct}$, the current will increase uncontrollably and the switching frequency is increased again so that a minimum number of pulses is sent to each switch before they have to be stopped altogether. A very low switching frequency could have implications such as the appearance of voltage ringing across a switch when it is open. An approximated solution of an example implementation for both cases (when $V_{ac}<V_{ct}$ and $V_{ac}>V_{ct}$) is given by the family of frequency curves 2407, 2408, 2409, and 2410, shown in FIG. 24C superimposed on the frequency curves 2404, 2405, and 2406. The simplicity of the approximated solution frequency curves comes from the fact that frequency is the only variable being adjusted to attain control over the current.

Figure 25:
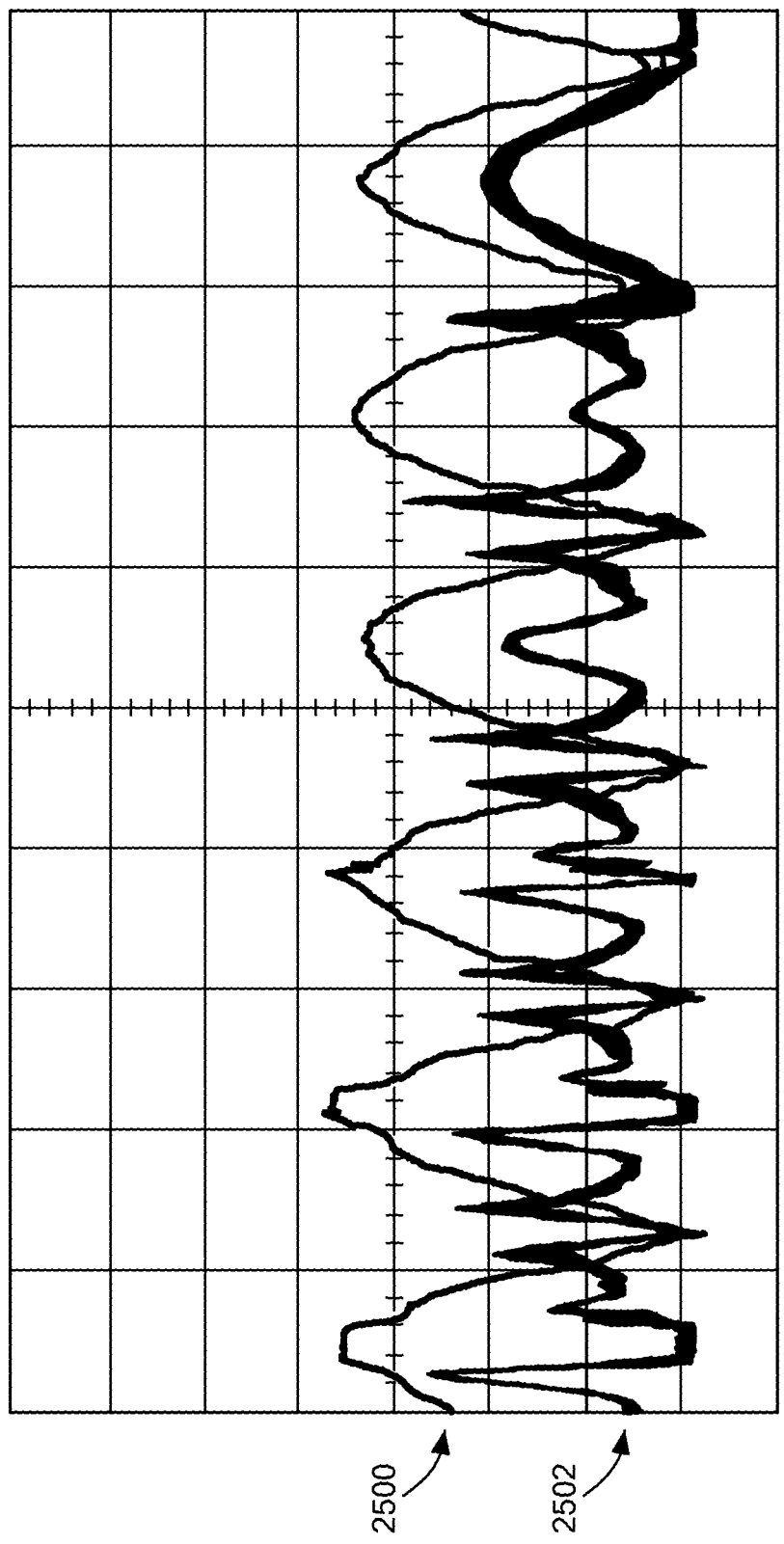

Referring to FIG. 25, once the center tap voltage (also called the reflected output voltage) $V_{ct}$ becomes greater than the peak of the AC line voltage 2500, the control module waits until the inductor current $I_{LO}$ 2502 (in proximity to the line voltage peak) is reduced below a predetermined value, and then enters the PFC operating mode. By using an alternative startup procedure that consumes more memory and processing cycles, PFC operation could be initiated earlier—at lower reflected voltages—with pulses being disabled when the AC line voltage becomes greater than the center tap voltage.

Figure 26:
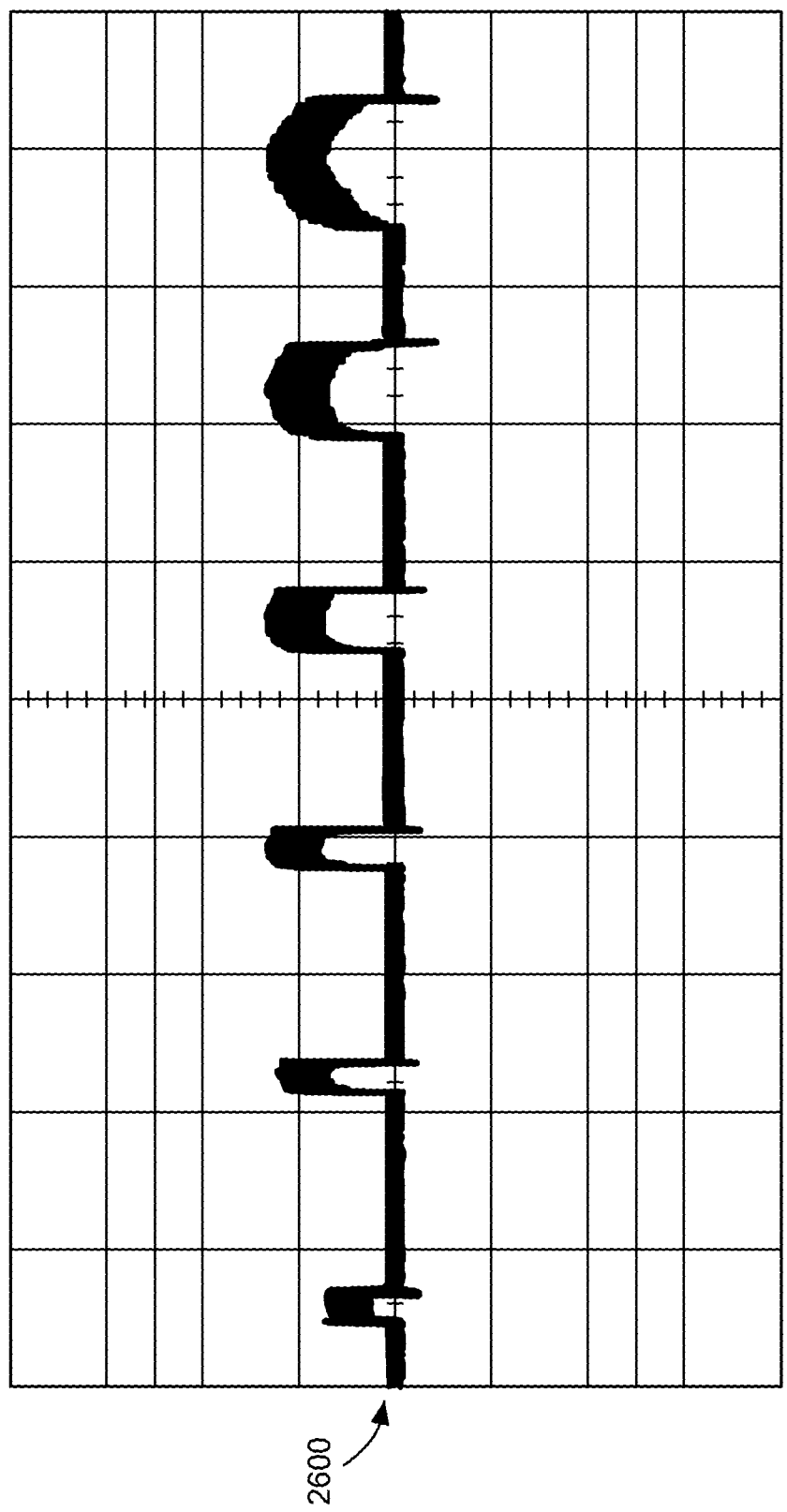

Referring to FIG. 26, in the PFC operating mode previously mentioned, the control module will command the current 2600 in the shape of a sine wave chopped off around the line zero crossings, with the conduction angle being decreased at light loads for improving the converter efficiency.

Figure 27A:
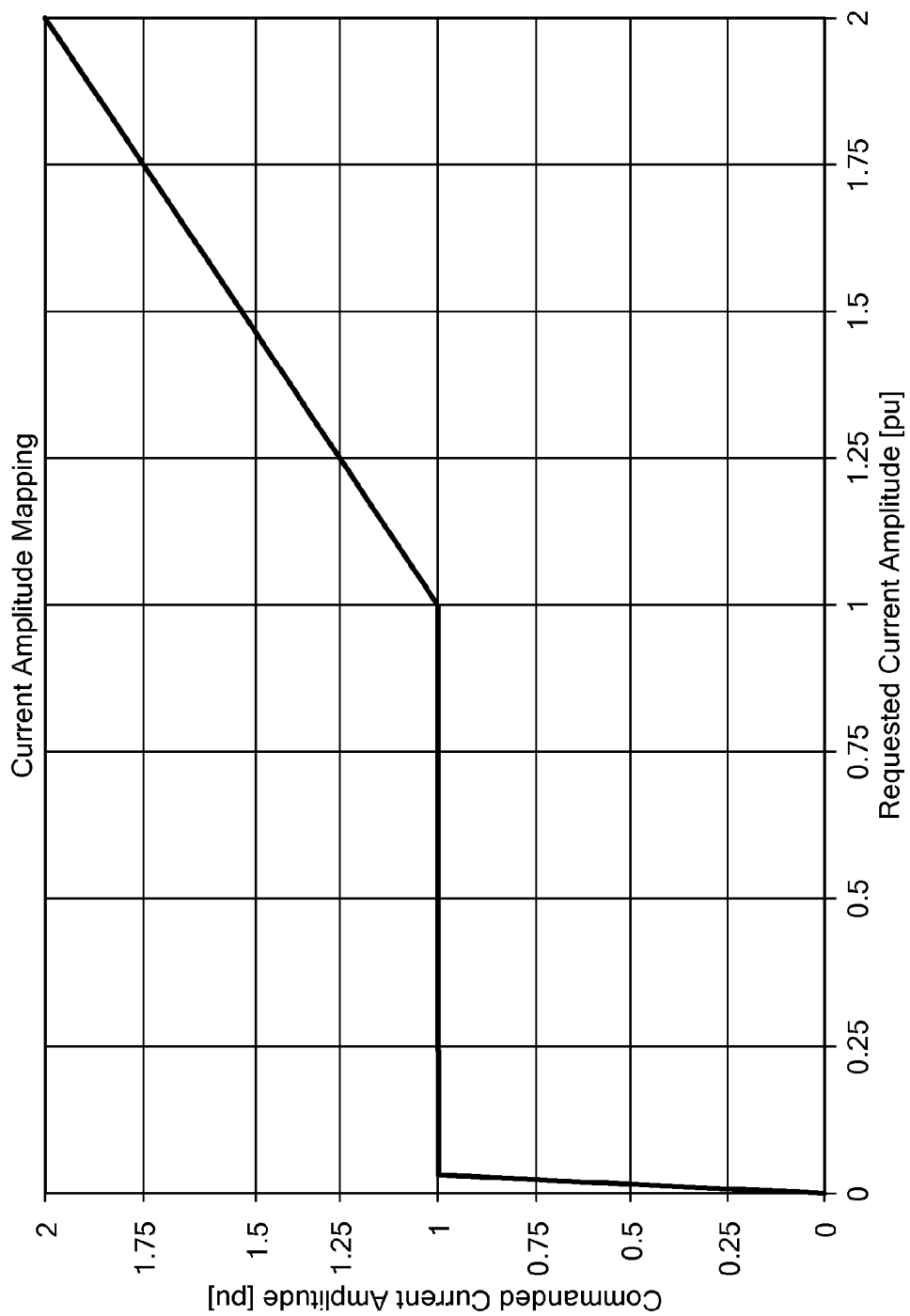
FIGS. 27A and 27B are plots of current amplitude and conduction angle mapping, respectively.
Figure 27B:
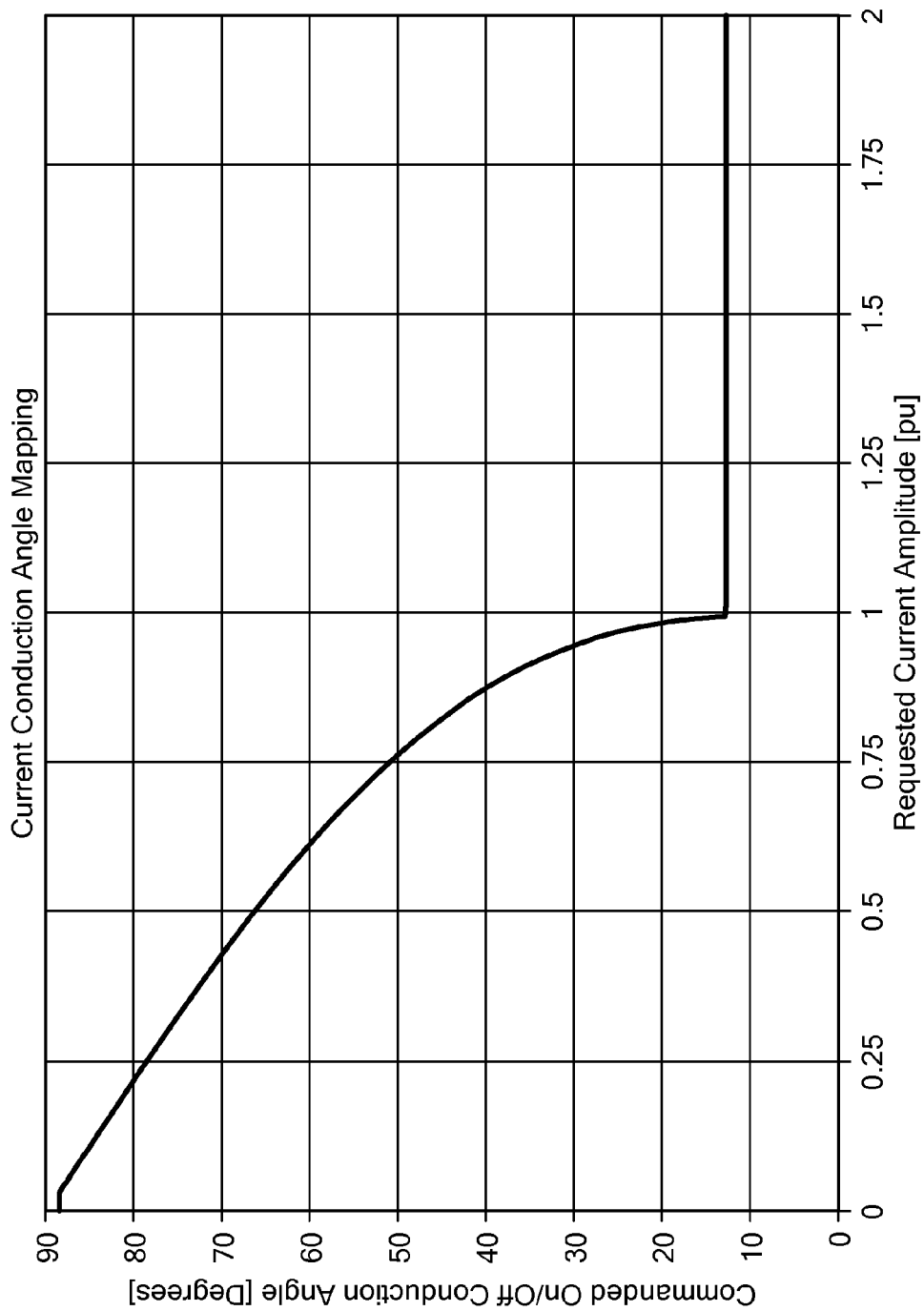

As it is shown in FIG. 27A, if the requested current drops below a predefined value of 1.0 pu, the amplitude of the commanded current is kept constant at the same 1.0 pu and the conduction angle decreases until it reaches a predefined minimum amount, at which point the amplitude begins to decrease again to be small enough for even lighter loads. The corresponding mapping of the turn on/off conduction angle is shown in FIG. 27B and it generates a chopped current having the same average power as the case where the conduction angle is maximum (corresponding to minimum on/off angle), therefore taking into account the reduction in the power factor.

Figure 28:
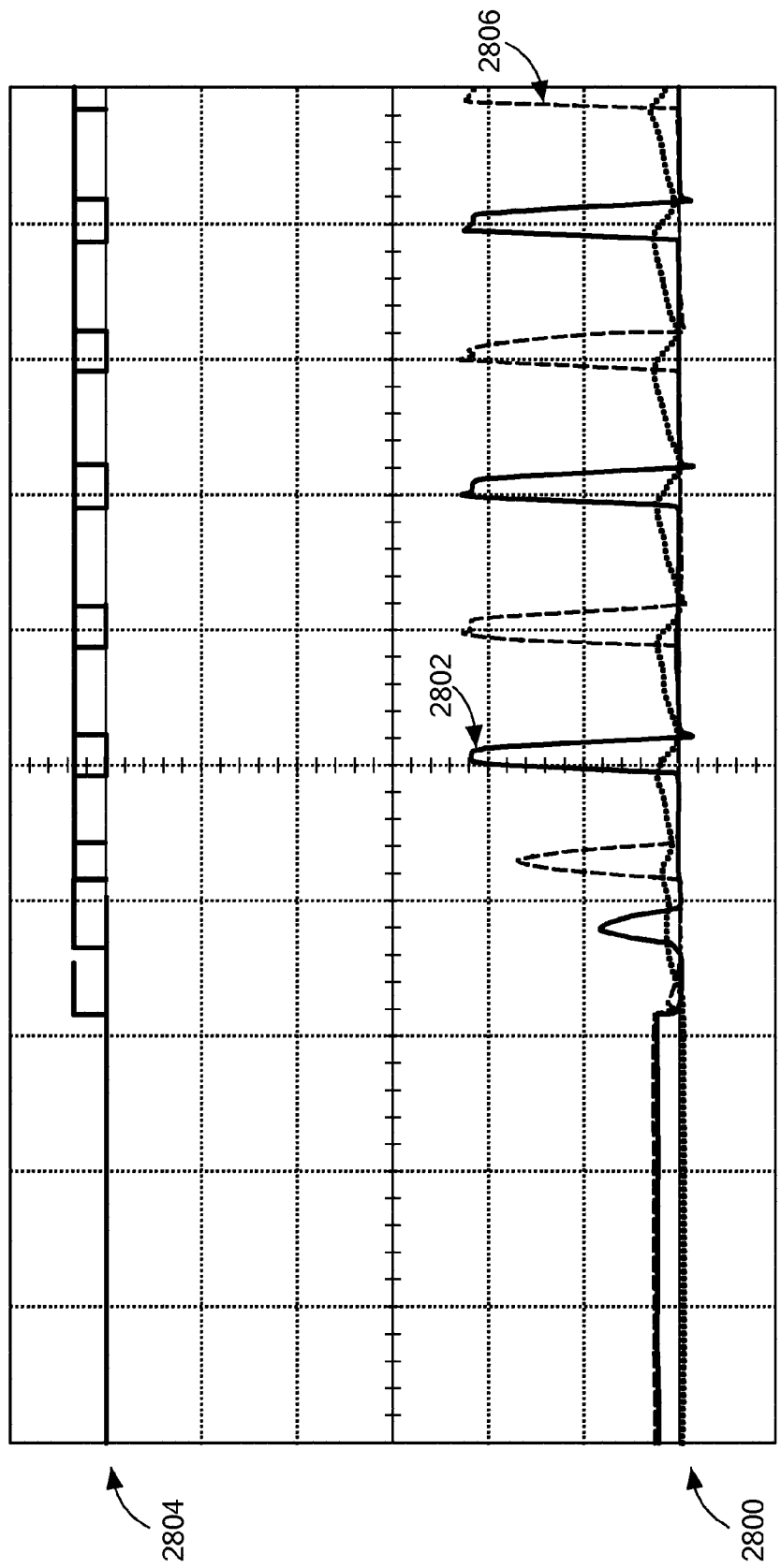

Also in this operating mode the power supply uses zero voltage switching (ZVS) with peak current mode control. ZVS is accomplished by turning a switch on preferably at the instant when the voltage developed across its open terminals falls back to zero. Referring to FIG. 28, at the beginning of every AC half cycle the commanded current is also small so as to follow a sinusoidal shape. Therefore, the inductor current $I_{LO}$ 2800 builds up from zero and no magnetizing current exists in the transformer, causing the first voltage pulse 2802 across the open switch $V_{sw}$ to be too small to be reliably detected as shown in FIG. 28. The duration of the first control pulses 2804 is then calculated so the inductor current $I_{LO}$ becomes sufficiently large to create a magnetizing current that can generate a detectable second pulse 2806 for the purpose of enabling ZVS. The pulse duration is an inversely proportional function of the input voltage. As an alternative to calculating the pulse duration, the control module could use a comparator to limit the current and toggle the pulses but for very high voltages the current could rise too fast and have an overshoot due to comparator and other delays. Also the comparator itself might not toggle if the current remains flat around the comparator threshold after turning off the switch. There could also be more complexity in the procedures used by the control module to have the current comparator enabled since before the first pulse, and for all these reasons some procedures enable the comparator after the second pulse.

The detection of the instant when the voltage developed across an open switch falls to zero is done in some implementations by using an analog comparator. A voltage threshold is predetermined for the comparator to toggle its output and it is selected to not be lower than the noise level present in the other comparator input. It also is selected to be high enough to account for the slope of the decaying voltage pulses and delays in the component chain going from the comparator output to the switch gate terminal. In addition, for improving the detection accuracy, the comparator voltage threshold is adapted to compensate for changes in the open switch voltages $V_{sw1}$ and $V_{sw2}$ as they change with the output voltage and the inductor current $I_{LO}$.

Figure 29:
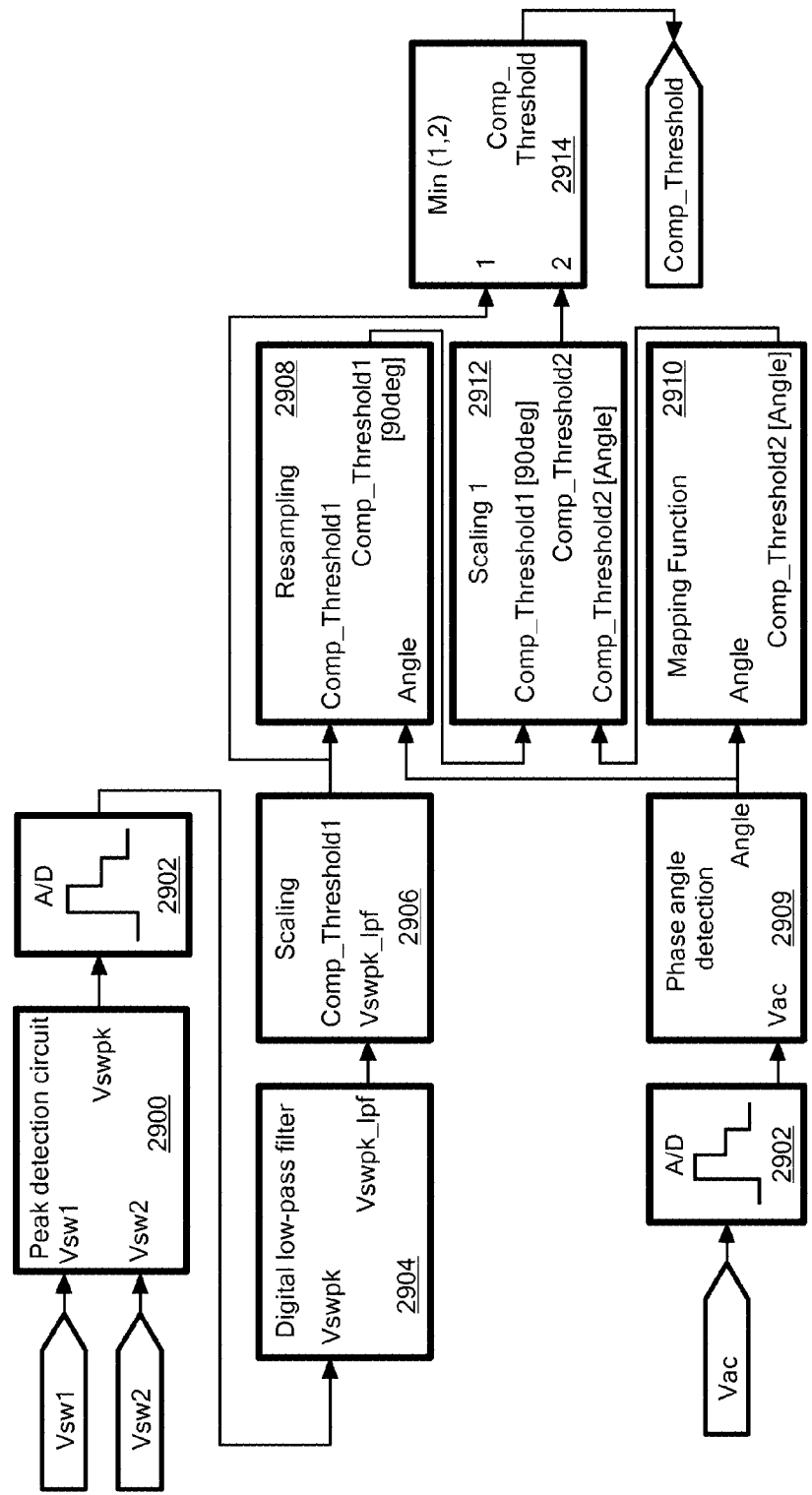

The block diagram in FIG. 29 shows an example of a portion of the control module configured for calculation of the threshold. A peak detection circuit 2900 exists in hardware to track the maximum values of the voltages $V_{sw1}$ and $V_{sw2}$ measured across the switch terminals. The resulting signal contains ripple that varies with the switching frequency and is also affected by switching noise. After being sampled by an analog-to-digital (A/D) sampling sub-module 2902, it passes through a digital low pass filter 2904 and a scaling sub-module 2906 to produce the first comparator threshold Comp_Threshold1. This signal is fed into a resampling sub-module 2908 so it can be re-sampled when the AC line phase angle is equal to 90°, producing Comp_Threshold1[90]. The phase angle is detected by a phase angle detection sub-module 2909, after sampling the AC line signal by an A/D sampling sub-module 2907. The phase angle is also used by a mapping function sub-module 2910 to obtain the second comparator threshold Comp_Threshold2[Angle], which is scaled by Comp_Threshold1[90°] in a subsequent scaling sub-module 2912 producing Comp_Threshold2.

Figure 30:
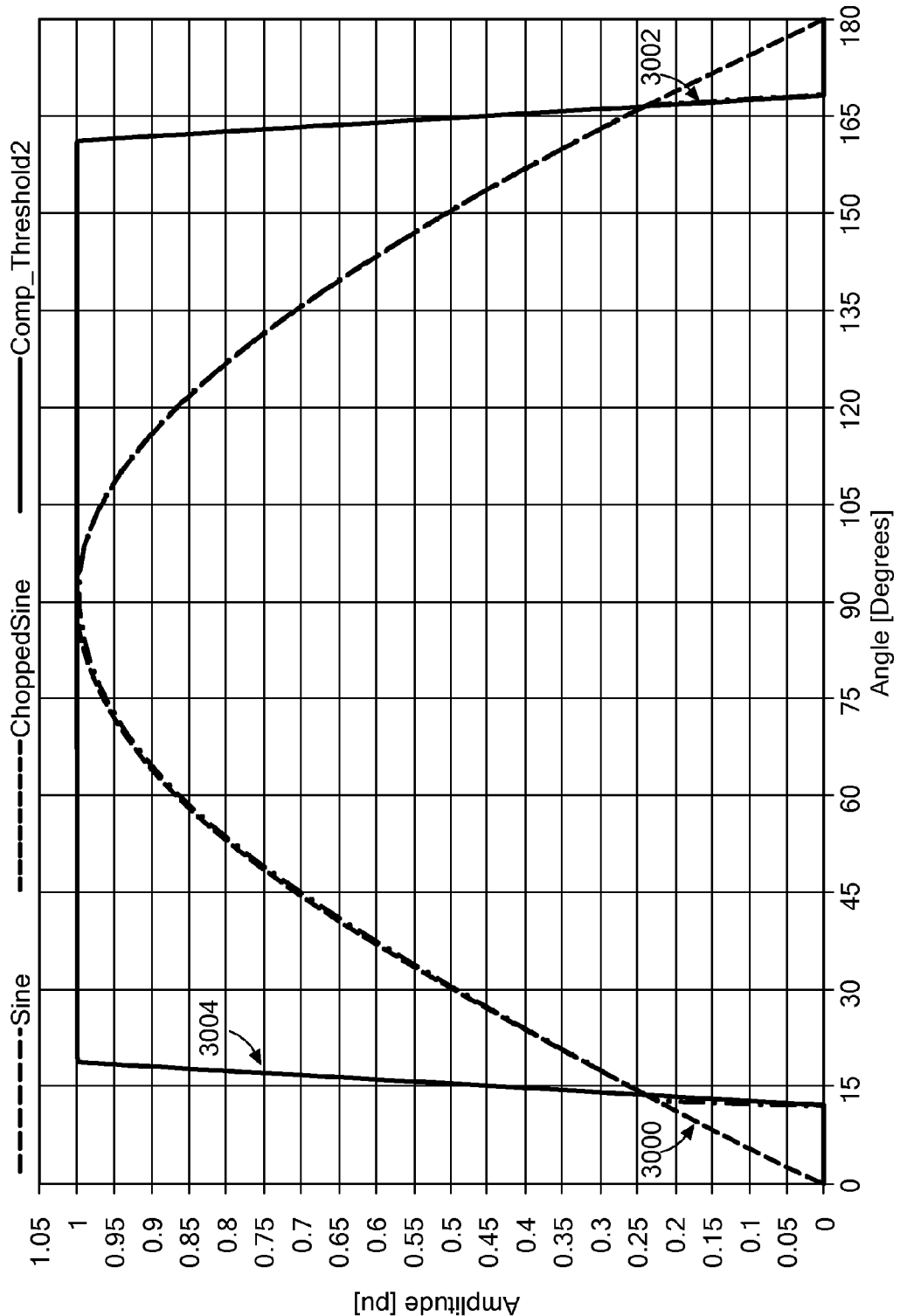
FIGS. 30 and 31 are sets of plots of circuit characteristics.

The normalized AC line half-cycle waveform 3000 is shown in FIG. 30, along with its associated chopped current waveform 3002 and the mapping function result for Comp_Threshold2[Angle] 3004, here shown with the maximum conduction angle. It should be noticed that as the current conduction angle changes so does the Comp_Threshold2 conduction angle in such a way that they both always remain in phase.

Figure 31:
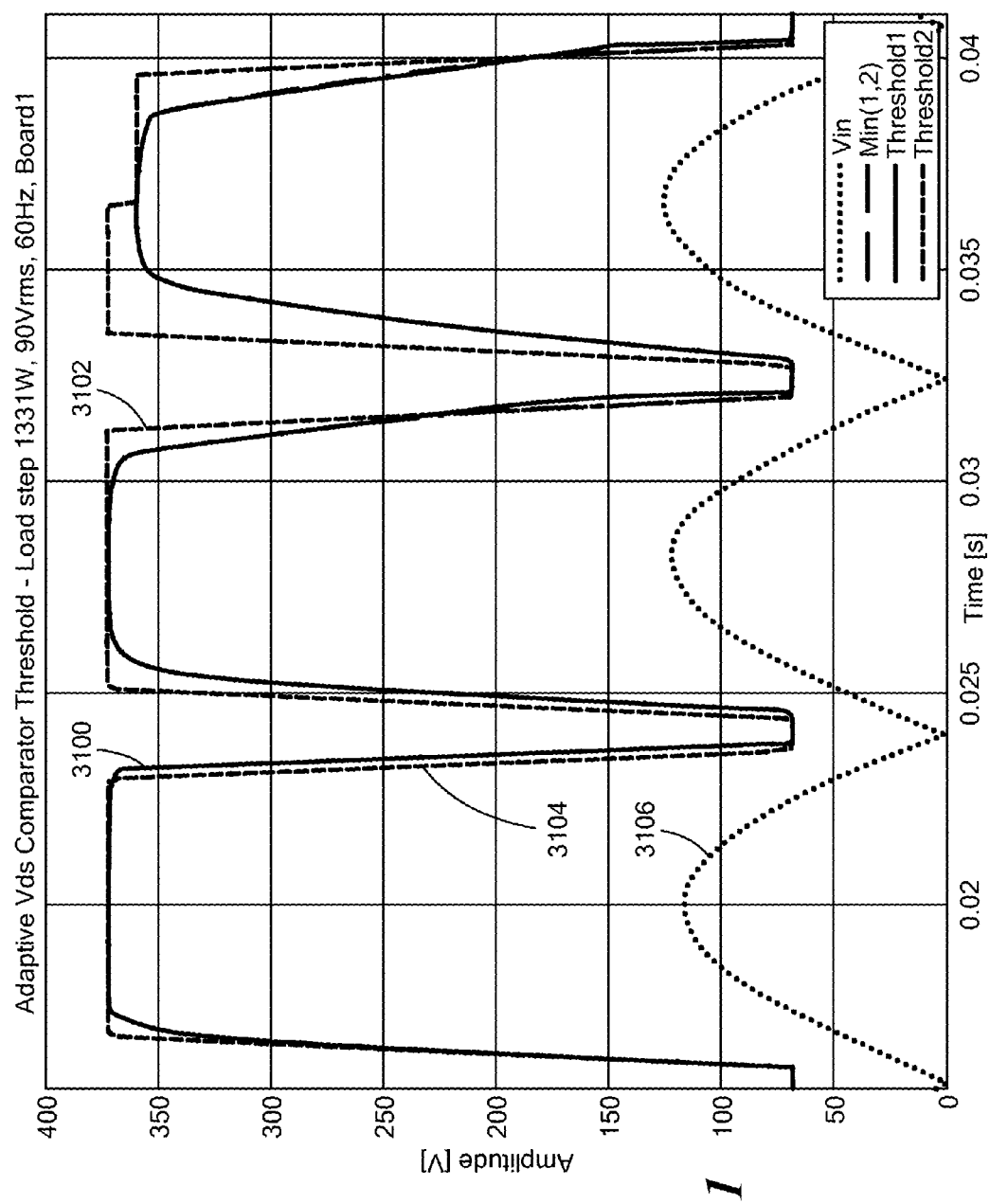

Referring again to FIG. 29, the final Comp_Threshold value, which is the one actually sent to the voltage comparators, is calculated by the last sub-module 2914 by taking the minimum between Comp_Threshold1 and Comp_Threshold2. As shown in FIG. 31, by using the minimum between Comp_Threshold1 3100 and Comp_Threshold2 3102, the adaptive algorithm ensures a more conservative—and therefore more robust—threshold 3104 to be sent to the comparators. The rectified AC line voltage is waveform 3106.

An example of steps performed during ZVS with peak current mode control is the following series of steps (starting from when both switches S1 and S2 are closed):

Step 1: Detect when the current rise hits a threshold;
Step 2: Open switch S1;
Step 3: Detect when the voltage developed across switch S1 falls below a calculated threshold;
Step 4: Close switch S1;
Step 5: Detect when the current rise hits a threshold;
Step 6: Open switch S2;
Step 7: Detect when the voltage developed across switch S2 falls below a calculated threshold;
Step 8: Close switch S2;
Repeat from Step 1

Another special case of operation of the power supply, in addition to startup operation, is that of light loads. This is one of the conditions that in some implementations calls for the inclusion of the upstream buck converter, as shown in FIG. 1. Alternatively, a clamp circuit can be utilized to manage light load conditions. Under light load conditions, the power supply can go into burst mode—switching normally at minimum controllable current level for some period of time, then turning off both switches, with the energy stored in the main inductor L1 (FIGS. 11 and 15) being dumped into the clamp circuit 1102 and used by the auxiliary power supply to power the control module. Under these conditions output regulation is achieved by controlling the ratio of time the power supply is switching to the time it is not switching.

The circuit descriptions until now have been confined to those employing static rectification—the rectification on the secondary side has been accomplished with diodes, which conduct current in only one direction. There are applications of this power supply for audio, where the use of synchronous rectification is desirable.

Figure 32:
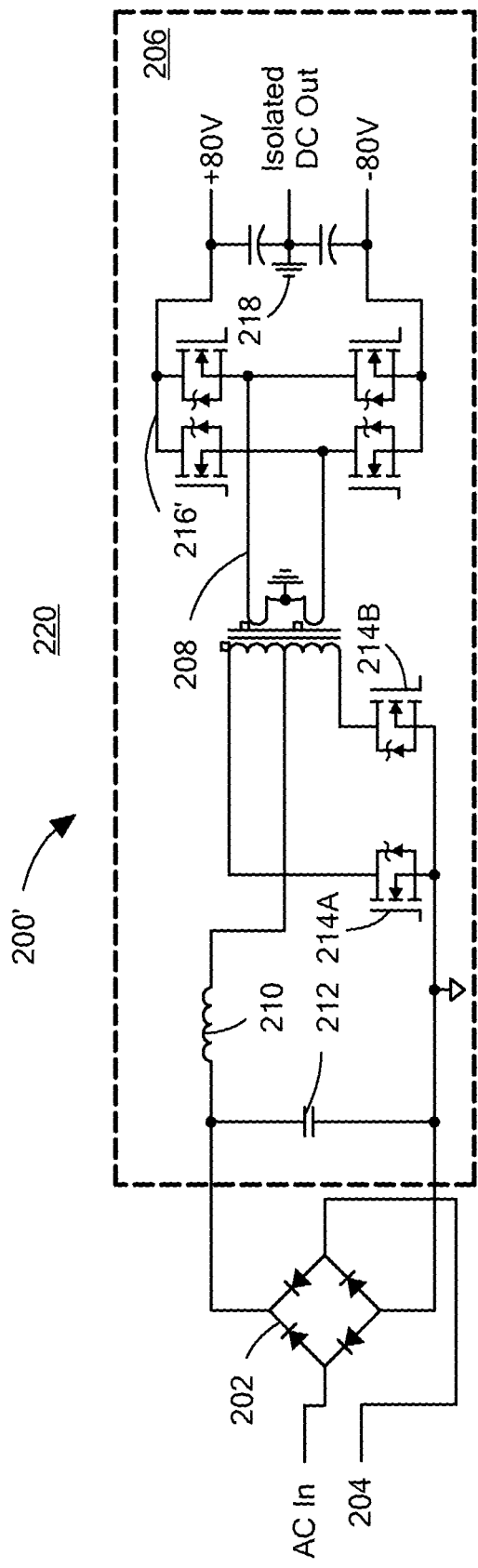
FIG. 32 is a circuit diagram of a synchronous rectification power supply.

In some embodiments, it may be desirable to include synchronous rectification in a push-pull topology power supply 200', as shown in FIG. 32. Note this power supply 200' is identical to the power supply 200 shown in FIG. 2, but with synchronous output rectifiers 216' substituted for the static output rectifiers 216.

Above, the control implications of ZVS operation on power supplies was discussed—specifically that the drain voltage falls of it's own accord, the control module senses that, and turns on the switches sometime after that happens. Synchronous rectification has the potential to change that dynamic. If the synchronous rectifier is turned off before the instant when the drain voltage falls, operation will be identical to that already described. However, if the synchronous rectifier is held on past that instant, the drain voltage will never fall, and the power supply would stop switching.

Figure 33:
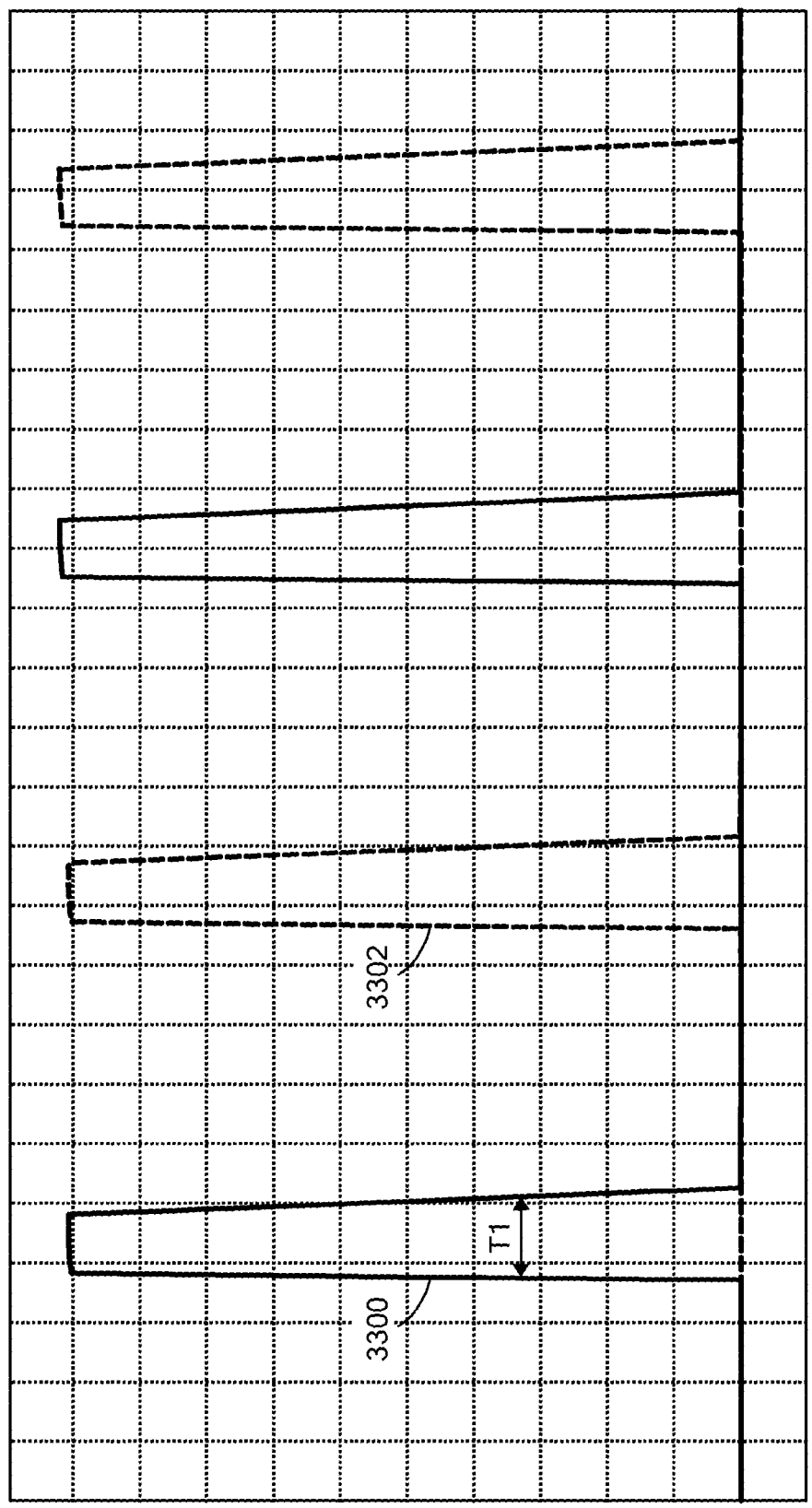
FIG. 33 is a set of plots of switch drain voltage waveforms.

In some implementations of the power supply, the control module can be configured to control synchronous rectification using a procedure illustrated in FIG. 33. A waveform 3300 shows the drain voltage of switch 214A (FIG. 32), and a waveform 3302 shows the drain voltage of switch 214B (FIG. 32). The procedure includes the following steps performed by the control module:

Measure the pulse width T1 of the drain voltage waveform 3300.

Use this measurement, together with measurements of power supply state (including inductor current, input and output voltage), along with information about characteristics of the power supply to set the pulse width of the synchronous rectifier control pulse applied to switches of the output rectifiers 216' for the next drain pulse 3302.

One aspect of this is that the rectifier control pulse will be smaller than the measured drain pulse by some margin—this will ensure that the power supply converges in a stable manner to the 'correct' synchronous rectifier pulse width.

Figure 34:
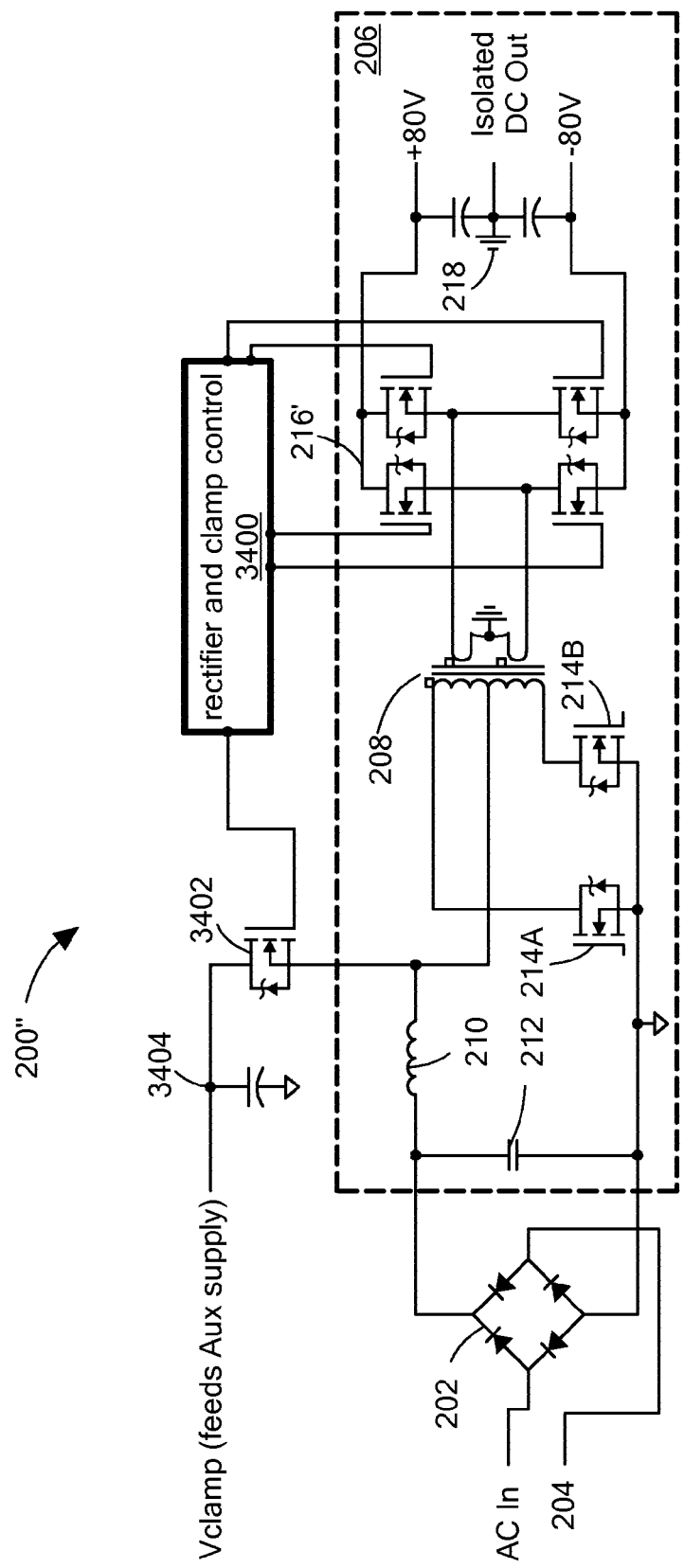
FIG. 34 is a circuit diagram of a power supply.

The control module is able to receive power from the auxiliary power supply to perform this synchronous rectifier control procedure, the startup procedure, and other control functions, which mitigates the excess energy from the leakage inductance that would otherwise have been dissipated or otherwise wasted without being redirected for useful purposes. The non-ideal 'reverse recovery' behavior of the clamp diode can also be used to help recover some of the energy that would otherwise be dumped into the clamp circuit. Referring to FIG. 34, a power supply 200" includes a rectifier and clamp control module 3400 can use the same signal used to control the synchronous rectifiers to control a MOSFET switch 3402, used in place of the catch diode D7 (FIGS. 11 and 15) of the clamp circuit, to control charging and discharging of the clamp capacitor 3404.

It is to be understood that the foregoing description is intended to illustrate and not to limit the scope of the invention, which is defined by the scope of the appended claims. Other embodiments are within the scope of the following claims.

What is claimed is:

1. An apparatus, comprising:
a power supply circuit including at least a first stage having a push-pull circuit topology, the first stage including at least one transformer that isolates a primary side of the first stage from a secondary side of the first stage;
a clamp circuit having a power input electrically coupled to a center tap of the transformer, the clamp circuit including a first element that stores energy, and a second element that controls a flow of current between the power input and the first element, the clamp circuit absorbing leakage energy from the transformer via the center tap and storing it in the first element; and
a control module receiving power from the clamp circuit, the control module configured to provide control signals to one or more elements of the power supply circuit.

2. The apparatus of claim 1, wherein the first element comprises a capacitor.

3. The apparatus of claim 1, wherein the flow of current between the center tap of the transformer and the first element is bidirectional.

4. The apparatus of claim 3, wherein the second element comprises a diode.

5. The apparatus of claim 4, wherein the diode has a reverse recovery time between about 200 ns and 800 ns.

6. The apparatus of claim 3, wherein the second element comprises a switch.

7. The apparatus of claim 6, wherein the switch comprises at least one transistor controlled by a signal from the control module.

8. The apparatus of claim 1, wherein the power supply comprises a switched-mode power supply that includes at least two switches in the first stage controlled by signals from control circuitry.

9. The apparatus of claim 8, wherein at least some of the control circuitry providing the signals to the switches is included in the control module.

10. The apparatus of claim 8, wherein the switches comprise transistors that include Silicon carbide.

11. The apparatus of claim 8, wherein the control circuitry is configured to:
detect instantaneous values and peak values of voltage across open switches in the first stage, detect instantaneous values of current flowing from the primary side to the center tap, and
calculate thresholds to be compared to the detected values to determine times at which to send control signals to open or close the switches in the first stage.

12. The apparatus of claim 11, wherein comparing the detected values to the calculated thresholds to determine the times at which to send the control signals includes:
in response to detected current values rising to a calculated threshold, sending a control signal to open one of the switches, and
in response to voltage across one of the switches falling to a calculated threshold, closing one of the switches.

13. The apparatus of claim 8, wherein the control circuitry is configured to enable control signals to alternate the switches between open and closed states according to a pattern that includes at least a portion in which a first switch is open while a second switch is closed and the first switch is closed while the second switch is open.

14. The apparatus of claim 13, wherein, during startup of the power supply, a feeding current from the primary side flows into the center tap of the transformer when the control signals are enabled.

15. The apparatus of claim 14, wherein, during startup of the power supply, the control circuitry is configured to periodically disable the control signals to maintain both the first and second switches in the open state, and thereby redirect the feeding current from the center tap of the transformer to the clamp circuit, in response to the feeding current reaching a predetermined maximum threshold.

16. The apparatus of claim 8, wherein the control circuitry is configured to control the switches such that an AC current flowing into an input of the power supply is substantially proportional to an AC voltage across the input of the power supply.

17. The apparatus of claim 1, further comprising an auxiliary power supply circuit coupled to the clamp circuit that receives power from the clamp circuit and provides power to at least the control module.

18. The apparatus of claim 1, wherein the primary side includes a third element that provides current to a center tap of the transformer.

19. The apparatus of claim 18, wherein the primary side is coupled to a rectifier circuit that provides a current to the third element from an input configured to couple to an AC line voltage.

20. The apparatus of claim 18, wherein the third element comprises an inductor.

21. The apparatus of claim 18, wherein the primary side includes a fourth element that participates in magnetizing inductance resonance.

22. The apparatus of claim 21, wherein the fourth element is coupled to the transformer.

23. The apparatus of claim 22, wherein the fourth element comprises at least one capacitor.

24. The apparatus of claim 1, wherein the secondary side includes a plurality of diodes coupled to the transformer.

25. The apparatus of claim 24, wherein the secondary side includes at least one capacitor configured to filter an output voltage for the power supply.

26. The apparatus of claim 1, wherein the secondary side is configured to provide at least 200 W of power when the primary side is coupled to an AC line voltage.

27. The apparatus of claim 26, wherein the secondary side is configured to provide at least 500 W of power when the primary side is coupled to an AC line voltage.

28. The apparatus of claim 27, wherein the secondary side is configured to provide at least 2 kW of power when the primary side is coupled to an AC line voltage.

* * * * *